United States Patent [19]
Sasamoto et al.

[11] Patent Number: 6,142,333
[45] Date of Patent: Nov. 7, 2000

[54] BI-DIRECTIONAL LID OPENING APPARATUS

[75] Inventors: Masayoshi Sasamoto; Seiichi Sato, both of Yokohama; Takashi Takeuchi, Ayase; Shogo Sasaoka, Isehara; Takehiro Terai, Atsugi, all of Japan

[73] Assignees: Piolax Inc.; Nissan Motor Co., Ltd., both of Kanagawa-ken, Japan

[21] Appl. No.: 08/865,300

[22] Filed: May 29, 1997

[30] Foreign Application Priority Data

| May 31, 1996 | [JP] | Japan | 8-159212 |
| May 31, 1996 | [JP] | Japan | 8-159213 |
| May 31, 1996 | [JP] | Japan | 8-159216 |
| May 31, 1996 | [JP] | Japan | 8-159217 |
| May 31, 1996 | [JP] | Japan | 8-159218 |

[51] Int. Cl.$^7$ ................................................ B65D 43/26
[52] U.S. Cl. ...................... 220/264; 220/263; 220/817; 220/830
[58] Field of Search .................. 49/193; 220/264, 220/263, 810, 817, 827, 830

[56] References Cited

U.S. PATENT DOCUMENTS

| 490,244 | 1/1893 | Craigie | 49/193 |
| 1,550,205 | 8/1925 | Cemazar . | |
| 3,048,899 | 8/1962 | Vincent . | |
| 4,811,518 | 3/1989 | Ladisa . | |
| 5,067,625 | 11/1991 | Numata . | |
| 5,195,272 | 3/1993 | Yamada . | |
| 5,357,652 | 10/1994 | Yamada | 49/193 X |

FOREIGN PATENT DOCUMENTS

| 48-104625 U | 12/1973 | Japan . |
| 54-14723 U | 1/1979 | Japan . |
| 56-171969 U | 12/1981 | Japan . |
| 3-189249 | 8/1991 | Japan . |
| 5-338496 | 12/1993 | Japan . |
| 7-011835 | 1/1995 | Japan . |
| 7-29149 U | 7/1995 | Japan . |

Primary Examiner—Stephen K. Cronin
Assistant Examiner—Robin A. Hylton
Attorney, Agent, or Firm—Ladas & Parry

[57] ABSTRACT

An opening and closing apparatus for a lid including a box body, a lid openable and closable in a first direction and a second direction relative to the box body, a movable member movable to a first position for opening the lid in the first direction, a second position for opening the lid in the second direction, and a closing position for closing the lid, first and second operating buttons integrally coupled to the opposite end portions of the movable member, a first biasing member for normally biasing the movable member to the closing position, and a holding member for holding the movable member in the first position against the biasing force of the first biasing member when the first operating button is pressed and the movable member is moved to the first position, and holding the movable member in the second position against the biasing force of the first biasing member when the second operating button is pressed and the movable member is moved to the second position, the holding member being disposed near the edge of the lid extending parallel to the first and second directions, the movable member being disposed off the center of the lid and near the holding member.

31 Claims, 30 Drawing Sheets

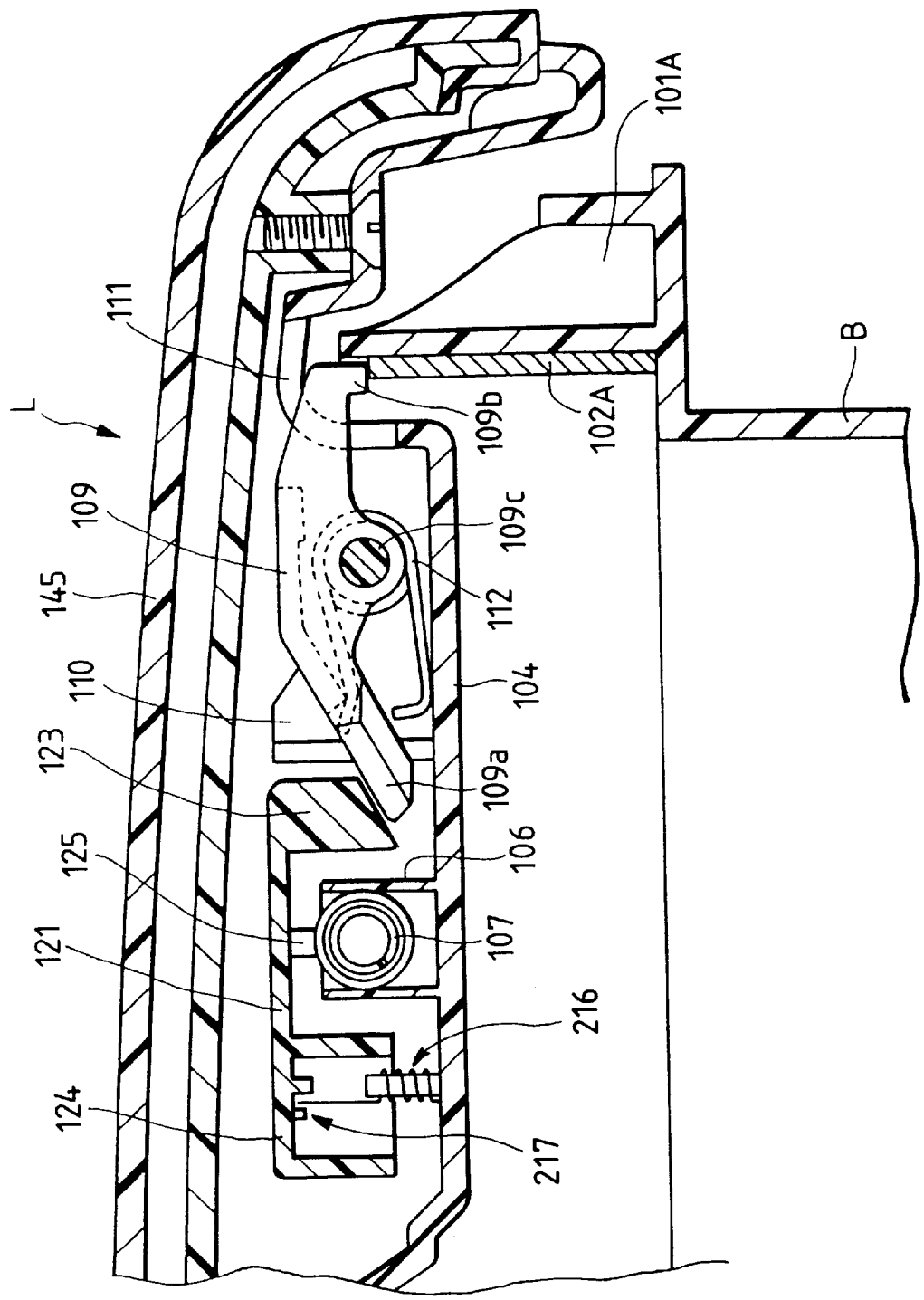

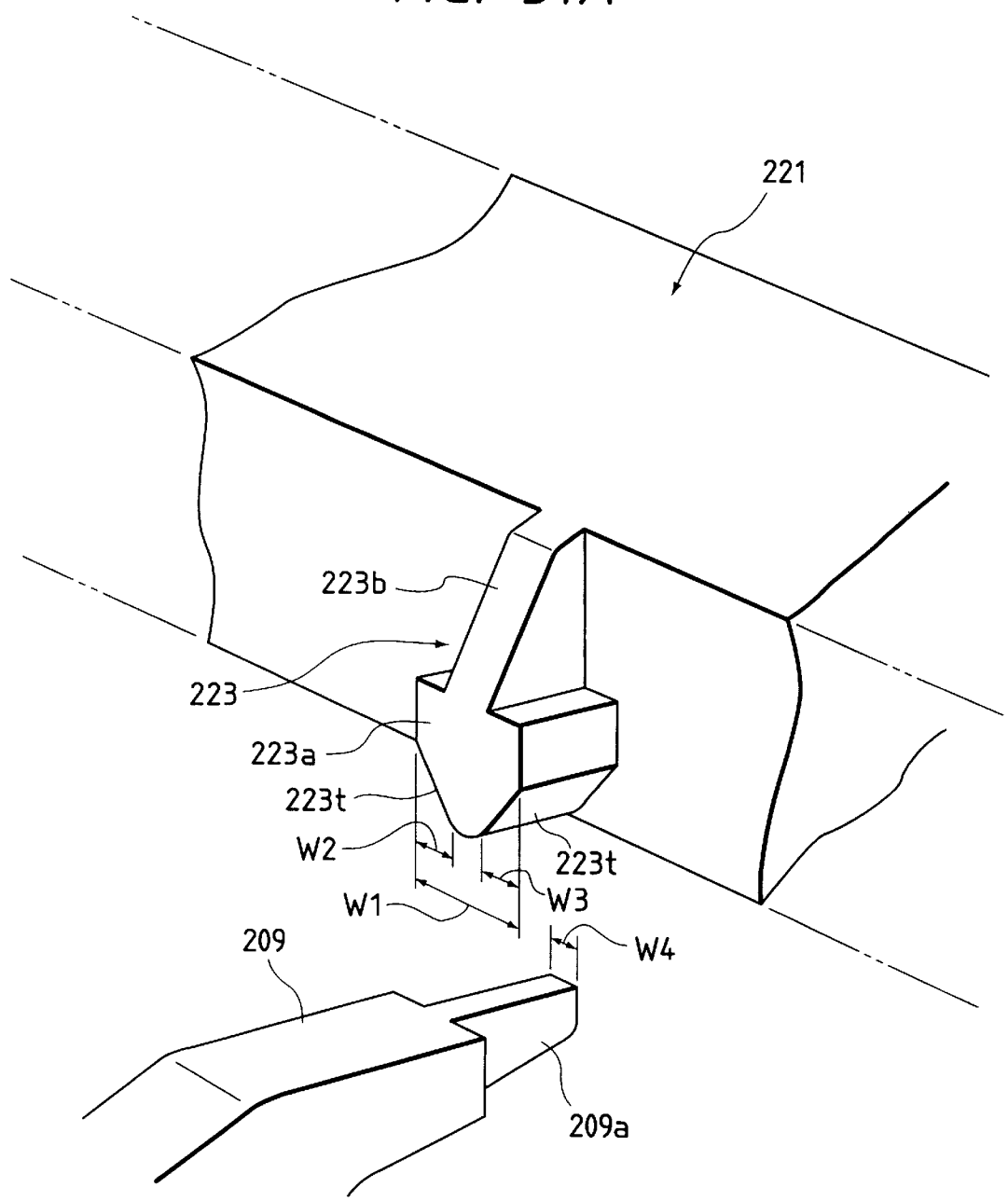

BI-DIRECTIONAL LID OPENING APPARATUS

BACKGROUND OF THE INVENTION

1. Field of the Invention

This invention relates to an opening and closing apparatus for lids pivotably mounted to openings in various box bodies including the lid of the console box of an automobile, and particularly to an opening and closing apparatus for a lid which can be opened and closed from two directions.

2. Related Background Art

As an apparatus for opening and closing the lid of the console box of an automobile from two directions, there has already been proposed one shown, for example, in Japanese Laid-Open Patent Application No. 5-338496.

This opening and closing apparatus according to the prior art, although not specifically shown, is of a construction in which for the lid side, a pair of right and left operating buttons operable independently of each other are pressably disposed on the right and left sides thereof and a pair of hinge pins making frequent appearances from the front and rear end surfaces of the lid are connected to the respective operating buttons and in a state in which one of the operating buttons is pressed, a lock shaft having just a length for bearing against the other operating button is provided on the back side of the pair of operating buttons and lock means for blocking the return of the operating buttons resulting from the pressing thereof are individually provided in the recesses of the undersides of the respective operating buttons. Even in this case, as in the conventional case, the pair of right and left operating buttons and the pair of hinge pins present on the respective sides are outwardly biased by the spring pressure of a compression coil spring.

Also, for the box body side, there are individually provided shaft holes for making the tip end portions of the hinge pins on the right and left sides come out and into the front and rear sides of the opening portion edge thereof.

When in the closed state of the lid, the lid is to be pivotally moved in the leftward direction to open the opening portion of the box body, if the operating button on the right side is inwardly pressed against the pressure of the biasing spring thereof, the pair of hinge pins present on the right side comes off the corresponding shaft holes in the box body against the pressure of the biasing spring thereof in operative association with the pressing movement of the operating button and fully comes into the lid, whereby the lid is permitted to pivotally move in the leftward direction about the pair of hinge pins engaged in the shaft holes in the box body on the left side.

At this time, the inwardly pressed operating button on the right side is placed in its locked state in which its return to the original biased position is blocked by the lock means thereof and therefore, it becomes unnecessary to continuedly press that operating button and the pivotal movement of the lid becomes highly convenient, and the operating button on the left side is prevented from being inwardly pressed by mistake, by the presence of the above-mentioned lock shaft, and therefore there is no fear that the entire lid comes off the box body side by a wrong operation.

When the lid pivotally moved in the leftward direction to thereby open the opening portion of the box body is to be closed, if the lid is pivotally moved in the rightward direction about the pair of hinge pins engaged in the shaft holes on the left side and the lid is brought down until it bears against the edge of the opening portion of the box body, the locked state of the operating button on the right side by the above-mentioned lock means is automatically released and therefore, the operating button on the right side is permitted to be returned to its original biased position by the pressure of the biasing spring thereof and at the same time, in operative association therewith, the pair of hinge pins on the right side submerged in the interior of the lid are again engaged in the corresponding shaft hole in the box body by the pressure of the biasing spring thereof, whereby the lid is closed.

Conversely, when the lid is to be pivotally moved in the rightward direction to open the opening portion of the box body, if the operating button on the left side is inwardly pressed against the pressure of the biasing spring thereof, the pair of hinge pins present on the left side come out of the corresponding shaft holes in the box body against the pressure of the biasing spring thereof in operative association with the pressing movement of that operating button and fully come into the interior of the lid, whereby the lid is permitted to pivotally move in the rightward direction about the pair of hinge pins engaged in the shaft holes in the box body on the right side.

When the lid pivotally moved in the rightward direction to thereby open the opening portion of the box body is to be closed, if the lid is pivotally moved in the leftward direction about the pair of hinge pins engaged in the shaft holes on the right side and is brought down until it bears against the edge of the opening portion of the box body, the locked state of the operating button on the left side by the above-mentioned lock means is automatically released and therefore, the operating button on the left side is permitted to be returned to its original biased position by the pressure of the biasing spring thereof and at the same time, in operative association therewith, the pair of hinge pins on the left side submerged in the interior of the lid are again engaged in the corresponding shaft holes in the box body by the pressure of the biasing spring thereof, whereby the lid is closed.

However, such an opening and closing apparatus according to the prior art makes the pivotally moving operation of the lid highly convenient by organically combining the lock means and the lock shaft, and effectively prevents the lid from coming off the box body by mistake, but in this case, in addition to the lock shaft, independent parts individually operating independently of one another must be used in the right and left operating buttons and the lock means therefor and therefore, of course, the number of parts increases by itself, and with the use of these independent parts, the accessory structure associated therewith has been liable to become vainly complicated.

Therefore, when grasping this in the entire apparatus, there has been the problem that the assembling work becomes cumbersome or the apparatus itself becomes costly.

SUMMARY OF THE INVENTION

It is an object of the present invention to provide an opening and closing apparatus for a lid openable and closable from two directions which can obtain an accurate opening and closing operation.

To achieve the above object, an opening and closing apparatus for a lid according to the present invention includes:

a box body;

a lid openable and closable in a first direction and a second direction relative to the box body;

a movable member movable to a first position for opening the lid in the first direction, a second position for opening the lid in the second direction, and a closing position for closing the lid;

first and second operating buttons integrally coupled to the opposite end portions of the movable member;

a first biasing member for normally biasing the movable member to the closing position; and a holding member for holding the movable member in the first position against the biasing force of the first biasing member when the first operating button is pressed and the movable member is moved to the first position, and holding the movable member in the second position against the biasing force of the first biasing member when the second operating button is pressed and the movable member is moved to the second position;

the holding member being disposed near the edge of the lid extending parallel to the first and second directions;

the movable member being disposed off the center of the lid and near the holding member.

Since the holding member is disposed near the edge of the lid extending parallel to the first and second directions and the movable member is disposed off the center of the lid and near the holding member, the length of the holding member can be shortened. Thereby, the bad influence of the inclination of the holding member and the flexure of the holding member can be decreased and therefore, the opening and closing of the lid of the opening and closing apparatus for the lid openable and closable from two directions can be effected accurately.

The movable member may have a stopper projection, the holding member is movable between an engagement position in which it is engageable with the stopper projection and a disengagement position in which it is disengaged from the stopper projection, and the apparatus may further include a second biasing member for normally biasing the holding member to the engagement position, whereby when the lid is closed, the holding member interferes with the box body, whereby the holding member is held in the disengagement position against the biasing force of the second biasing member, and when the lid is opened in the first or second direction, the holding member is held in the engagement position by the biasing force of the second biasing member.

Consequently, according to the aforedescribed construction, functionally, as in the opening and closing apparatus according to the prior art, the pivotal movement operation of the lid is made highly convenient and the lid can be effectively prevented from coming off the box body by mistake, but structurally, the pair of right and left operating buttons are integrally connected to the opposite end portions of the movable member and thus, the pair of operating buttons are made integral with the movable member, whereby it becomes possible to rationally control the movement of the movable member itself to which the pair of operating buttons are connected, by the action of one lock or the action of one check lever and one stopper projection relative to the movable member and therefore, as compared with the prior-art apparatus, the apparatus of the present invention can greatly contribute to the curtailment of the number of parts and the simplification of the apparatus itself.

The aforedescribed apparatus may further include a pair of first hinge pins inserted in a pair of first holes formed in the box body, and retractable from the pair of first holes in operative association with the movement of the movable member to the first position, a pair of second hinge pins inserted in a pair of second holes formed in the box body, and retractable from the pair of second holes in operative association with the movement of the movable member to the second position, a first cam slot formed in that end portion of the movable member which is adjacent to the first operating button, and comprising a regulating portion and a non-regulating portion, a second cam slot formed in that end portion of the movable member which is adjacent to the second operating button, and comprising a regulating portion and a non-regulating portion, a first follower provided on each of the pair of first hinge pins and engaged with the first cam slot, and a second follower provided on each of the pair of second hinge pins and engaged with the second cam slot.

According to the aforedescribed construction, since the cam slot in which the followers of the hinge pins are fitted comprises a regulating portion and a non-regulating portion, the pressing operation of the operating buttons becomes easy.

The aforedescribed apparatus may further include a rib adapted to contact with at least one of the pair of first hinge pins and at least one of the pair of second hinge pins and provide flexure thereto.

According to the aforedescribed construction, since the hinge pins are flexed by the rib wall, the shaking of the hinge pins during movement can be effectively prevented.

The aforedescribed apparatus may further include a bead provided on the box body, and a third biasing member engageable with the bead in the fully opened state of the lid to thereby hold the lid in its fully opened state.

By the above-described construction, the fully opened posture of the lid is maintained reliably.

The aforedescribed apparatus may include a pair of first hinge pins inserted in a pair of first holes formed in the box body, and retractable from the pair of first holes in operative association with the movement of the movable member to the first position, and a pair of second hinge pins inserted in a pair of second holes formed in the box body, and retractable from the pair of second holes in operative association with the movement of the movable member to the second position, each of the pair of first holes may have an outline edge, each of the pair of second holes may have an outline edge, and the holding member may be designed to come into engagement with the movable member in a first state in which the first or second hinge pins and the outline edges of the first or second holes are greatly spaced apart from each other in the opening direction of the lid, to thereby prohibit the first or second hinge pins from moving toward the first or second holes, and come out of engagement with the movable member in a second state in which the first or second hinge pins and the outline edges of the first or second holes are proximate to each other in the opening direction of the lid, to thereby permit the first or second hinge pins to resiliently contact with the outline edges of the first or second holes by the biasing force of the first biasing member, and to be gradually moved until the first or second hinge pins contact with the outline edges of the first or second holes in a process wherein the lid pivotally moves from the first state to the second state.

Consequently, according to the aforedescribed construction, the action of control means for detecting the angle of opening of the lid and controlling the hinge pins is obtained, and in the vicinity of the fully closed state of the lid, the hinge pins are once caused to bear against the outline edges of the corresponding concave hole portions, and then at a point of time whereat the hinge pins have become coincident with the concave hole portions, the hinge pins are engaged in the concave hole portions by the biasing means thereof and therefore, there is no possibility of a wrong operation occurring, and it never happens that the lid comes off the box body by mistake.

The movable member may have a stopper projection, the holding member is movable between an engagement position in which it is engageable with the stopper projection and a disengagement position in which it is disengaged from the stopper projection, and the apparatus may further include a second biasing member for normally biasing the holding member to the engagement position, and a side supporting member for guiding that portion of the holding member which is engageable with the stopper projection.

According to the aforedescribed construction, in addition to the above-noted advantages, the feeling of operation is improved, and according to the aforedescribed construction, the elastic deformation of the check lever is decreased and the positional accuracy of a tapered surface in the right to left direction is improved and therefore, the movement of the hinge pins is highly accurately maintained and the occurrence of the aforementioned wrong operation is prevented more reliably.

The holding member may have a vertical surface in that portion thereof which is engageable with the stopper projection, and a tapered surface continuous from the vertical surface.

The holding member may be such that the vertical surface is formed on both sides of the lower portion thereof and a tapered surface continuous from the vertical surface is formed on both sides of the upper portion thereof, and the first and second hinge pins each may have a chamfered tip end portion.

The stopper projection may have a vertical surface in that portion thereof engaged by the holding member, and a tapered surface continuous from the vertical surface.

According to the aforedescribed construction, the feeling of operation is improved.

The aforedescribed apparatus may include a holding block containing the first biasing member therein and having two guide ports opposed to each other in the direction of movement of the movable member, and a pair of legs provided on the movable member and engageable with the opposite end portions of the biasing member.

According to the aforedescribed construction, the movable member connected to the operating buttons is biased to the centering position by a spring contained in the holding block and therefore, there is no fear that the feeling of operation becomes non-uniform as in the prior art even if during the opening operation, the operating buttons are pressed from any direction.

The intermediate portion of the movable member may be defined by an upper wall and two side walls, and the holding block may be surrounded by the upper wall and the two side walls.

According to the aforedescribed construction, the holding block is surrounded by the upper wall and two side walls of the movable member and therefore, the effective utilization of space becomes possible and the propagation of sound created during the expansion and contraction of the compression coil spring can be suppressed.

The pair of legs may be provided perpendicularly to the upper wall of the movable member between the central portion of the underside of the upper wall and the two side walls.

According to the aforedescribed construction, the two side walls and legs are made to exist in the intermediate portion of the movable member and therefore, the rigidity of the movable member itself can be improved and also, it becomes possible for the legs to interfere with the centers of the opposite end portions of the compression coil spring and thus, the stable expansion and contraction of the compression coil spring can be ensured.

The movable member may have a rib wall facing an opening formed in the upper portion of the holding block.

The first biasing member may be a compression coil spring, and the apparatus may further include caps disposed on the opposite end portions of the compression coil spring.

By the above-described construction, the buckling of the compression coil spring can be effectively prevented.

The apparatus may include a pair of first hinge pins inserted in a pair of first holes formed in the box body, and retractable from the pair of first holes in operative association with the movement of the movable member to the first position, a pair of second hinge pins inserted in a pair of second holes formed in the box body, and retractable from the pair of second holes in operative association with the movement of the movable member to the second position, two guide cams each having a guide wall and a reversing projection disposed at a predetermined distance from the guide wall, and provided symmetrically along the direction of movement of the movable member, and a spring bar having two tip end portions engageable with the guide cams, and may be designed such that one of the tip end portions of the spring bar is guided by the reversing projection of one of the guide cams and is biased away from the guide wall while in operative association with the operation of the first operating button, the pair of first hinge pins move in a direction to retract from the pair of first holes, and after the pair of first hinge pins have retracted from the pair of first holes, one of the tip end portions of the spring bar is moved toward the guide wall by the spring force of the spring bar, and on the other hand, the other of the tip end portions of the spring bar is guided by the reversing projection of the other of the guide cams and is biased away from the guide wall while in operative association with the operation of the second operating button, the pair of second hinge pins move in a direction to retract from the pair of second holes, and after the pair of second hinge pins have retracted from the pair of second holes, the other of the tip end portions of the spring bar is moved toward the guide wall by the spring force of the spring bar.

According to the aforedescribed construction, after the hinge pins have come out of the shaft holes in the box body by the operation of the operating buttons, the tip end portion of the spring bar is moved from the reversing projection side to the guide wall by the resilient biasing force, whereby as soon as the operating load to the operating button changes, a pleasant sound "clang" is produced.

Accordingly, an operator can manually confirm the change in the operating load, and can confirm the pleasant sound by ears and thus, can confirm on the spot that the hinge pin on the opened side has come out of the corresponding shaft hole in the box body.

Design may also be made such that when one of the tip end portions of the spring bar is guided and moved by the reversing projection of corresponding one of the guide cams, the other of the tip end portions of the spring bar stays on the guide wall of the corresponding other of the guide cams.

By the aforedescribed construction, the wrong operations of the spring bar and guide cams are eliminated.

The guide cams each may include a return path having an inclined portion for gradually pressing the tip end portion of the spring bar between the guide wall and the reversing projection, and a stepped portion for liberating the pressing in the end portion of the inclined portion, and the tip end portion of the spring bar may be designed such that the tip end portion of the spring bar moves on the return path while the lid changes from its opened state to its closed state and the hinge pins move in a direction to be inserted into the holes, and after the hinge pins have been inserted into the holes, the tip end portion of the spring bar strikes against the bottom of the stepped portion by the spring force of the spring bar.

By the aforedescribed construction, the return of the hinge pins to their neutral position can also be confirmed from a pleasant sound.

The spring bar and the guide cams may preferably be disposed on the side opposite to the holding member with respect to the movable member.

By the aforedescribed construction, well-balanced smooth opening and closing operations and space saving resulting from separation can be expected.

The guide cams may be provided on the lid, and the spring bar may be provided on the movable member.

The guide cams may be provided on the movable member, and the spring bar may be provided on the lid.

The apparatus may include a pair of first hinge pins inserted in a pair of first holes formed in the box body, and retractable from the pair of first holes in operative association with the movement of the movable member to the first position, a pair of second hinge pins inserted in a pair of second holes formed in the box body, and retractable from the pair of second holes in operative association with the movement of the movable member to the second position, a first hinge pin guide portion for guiding the pair of first hinge pins, a second hinge pin guide portion for guiding the pair of second hinge pins, and first and second movable member guide portions slidably contacting with the movable member to guide the movement of the movable member resulting from the pressing of the first or second operating button, the first movable member guide portion may be disposed adjacent to the first hinge pin guide portion, and the second movable member guide portion may be disposed adjacent to the second hinge pin guide portion.

According to the aforedescribed construction, the guide portion for guiding the movement of the movable member which is long is provided outwardly at a longest possible distance and therefore, it become possible to smoothly guide the movement of the movable member resulting from the pressing of the operating button without shaking and thus, a smooth opening operation including the coming in and out of the hinge pins can always be ensured.

The first hinge pin guide portion and the first movable member guide portion may be provided integrally with a first guide member fixed adjacent to a first edge of the lid which is opened in the first direction, and the second hinge pin guide portion and the second movable member guide portion may be provided integrally with a second guide member fixed adjacent to a second edge of the lid which is opened in the second direction.

According to the aforedescribed construction, the guide portion for the movable member and the guide portion for the hinge pins are provided integrally with the guide members and therefore, the guide of the relative movement of the movable member and the hinge pins becomes reliable.

The first guide member may be such that the first movable member guide portion and the first hinge pin guide portion are provided in succession from the fixed portion fixed to the lid toward the first edge, the first hinge pin guide portion may have a posture holding member bearing against the inner surface of the lid, the second guide member may be such that the second movable member guide portion and the second hinge pin guide portion are provided in succession from the fixed portion fixed to the lid toward the second edge, and the second hinge pin guide portion may have a posture holding member bearing against the inner surface of the lid.

According to the aforedescribed construction, the guide members are provided with posture holding pieces and therefore, the supporting rigidity of the guide portions for the movable member and hinge pins is improved.

Each of the first and second guide members may have a resilient pawl portion to be tentatively attached to the movable member.

According to the aforedescribed construction, the movable member and the guide member can be tentatively assembled together by an elastic piece for tentative assemblage and therefore, the assembling work becomes easy.

The apparatus may include a first cam slot formed in that end portion of the movable member which is adjacent to the first operating button, a second cam slot formed in that end portion of the movable member which is adjacent to the second operating button, a first follower provided on each of the pair of first hinge pins and engaged with the first cam slot, and a second follower provided on each of the pair of second hinge pins and engaged with the second cam slot, the first hinge pin guide portion may slidably contact with the surface portion of the movable member in which the first cam slot is formed, and the second hinge pin guide portion may slidably contact with the surface portion of the movable member in which the second cam slot is formed.

According to the aforedescribed construction, the guide portions slidably contact with the outer edges defining the cam slots and therefore, even when an unexpected extraneous force is applied to the cam slot side, the damage of the cam slots themselves can be effectively prevented.

Also, it is an object of the present invention to provide an opening and closing apparatus for a lid which is small in the number of parts and simplified in structure.

To achieve this object, an opening and closing apparatus for a lid according to the present invention includes:

a box body;

a lid openable and closable in a first direction and a second direction relative to the box body;

a movable member movable to a first position for opening the lid in the first direction, a second position for opening the lid in the second direction, and a closing position for closing the lid;

first and second operating buttons integrally coupled to the opposite end portions of the movable member;

a first biasing member for normally biasing the movable member to the closing position; and a holding member for holding the movable member in the first position against the biasing force of the first biasing member when the first operating button is pressed and the movable member is moved to the first position, and holding the movable member in the second position against the biasing force of the first biasing member when the second operating button is pressed and the second movable member is moved to the second position.

Also, it is an object of the present invention to provide an opening and closing apparatus for a lid in which the lid does not come off a box body by mistake.

To achieve this object, an opening and closing apparatus for a lid according to the present invention includes:

a box body;

a lid openable and closable in two directions relative to the box body;

an operating button for opening and closing the lid;

a pair of hinge pins inserted in a pair of holes formed in the box body, and retractable from the pair of holes in operative association with the operating button, each of the pair of holes having an outline edge;

a biasing member;

a link for inserting the pair of hinge pins into the pair of holes by the biasing force of the biasing member; and a holding member for holding the link to cause the pair of hinge pins to be retracted from the pair of holes against the biasing force of the biasing member when the operating button is pressed;

the holding member being adapted to come into engagement with the link to thereby prohibit the hinge pins from moving toward the holes in a first state in which the hinge pins and the outline edges are greatly spaced apart from each other in the opening direction of the lid, and to be disengaged from the link to thereby permit the hinge pins to resiliently contact with the outline edges of the holes by the biasing force of the biasing member in a second state in which the hinge pins and the outline edges are proximate to each other in the opening direction of the lid, and to move the hinge pins gradually until they contact with the outline edges in the process of the lid being pivotally moved from the first state to the second state.

It is also an object of the present invention to provide an opening and closing apparatus for a lid in which the feeling of operation does not differ even if operating buttons are pressed from any direction.

To achieve the above object, an opening and closing apparatus for a lid according to the present invention includes:

a box body;

a lid openable and closable in a first direction and a second direction relative to the box body;

a movable member movable to a first position for opening the lid in the first direction, a second position for opening the lid in the second direction, and a closing position for closing the lid;

first and second operating buttons connected to the opposite end portions of the movable member;

a biasing member for normally biasing the movable member to the closing position;

a holding block containing the biasing member therein and having two opposed guide ports in the direction of movement of the movable member; and a pair of legs provided on the movable member and engageable with the opposite end portions of the biasing member.

It is also an object of the present invention to provide an opening and closing apparatus for a lid in which pleasant sound can be confirmed by ears to thereby confirm the opening and closing of the lid.

To achieve this object, an opening and closing apparatus for a lid according to the present invention includes:

a box body;

a lid openable and closable in two directions relative to the box body;

an operating button for opening and closing the lid;

a hinge pin inserted in a hole formed in the box body, and retractable from the hole in operative association with the operation of the operating button;

a guide cam having a guide wall and a reversing projection disposed at a predetermined distance from the guide wall; and a spring bar having a tip end portion engageable with the guide cam;

wherein the tip end portion of the spring bar is guided and biased away from the guide wall by the reversing projection while the hinge pin is moved in a direction to be retracted from the hole in operative association with the operation of the operating button, and after the hinge pin has been retracted from the hole, the tip end portion of the spring bar is moved toward the guide wall by the spring force of the spring bar.

It is also an object of the present invention to provide an opening and closing apparatus for a lid in which a smooth opening operation is ensured.

To achieve this object, an opening and closing apparatus for a lid according to the present invention includes:

a box body;

a lid openable and closable in a first direction and a second direction relative to the box body;

a movable member movable to a first position for opening the lid in the first direction, a second position for opening the lid in the second direction, and a closing position for closing the lid;

first and second operating buttons integrally coupled to the opposite end portions of the movable member;

a first biasing member for normally biasing the movable member to the closing position;

a pair of first hinge pins inserted in a pair of first holes formed in the box body, and retractable from the pair of first holes in operative association with the movement of the movable member to the first position;

a pair of second hinge pins inserted in a pair of second holes formed in the box body, and retractable from the pair of second holes in operative association with the movement of the movable member to the second position;

a first hinge pin guide portion for guiding the pair of first hinge pins;

a second hinge pin guide portion for guiding the pair of second hinge pins; and first and second movable member guide portions slidably contacting with the movable member to guide the movement of the movable member resulting from the pressing of the first or second operating button;

the first movable member guide portion being disposed adjacent to the first hinge pin guide portion, the second movable member guide portion being disposed adjacent to the second hinge pin guide portion.

BRIEF DESCRIPTION OF THE DRAWINGS

FIG. 30 is a modified example of a spring bar and a guide cam.

FIGS. 31A and 31B are modified examples of a stopper projection and a check lever.

DESCRIPTION OF THE PREFERRED EMBODIMENTS

Figure 1:
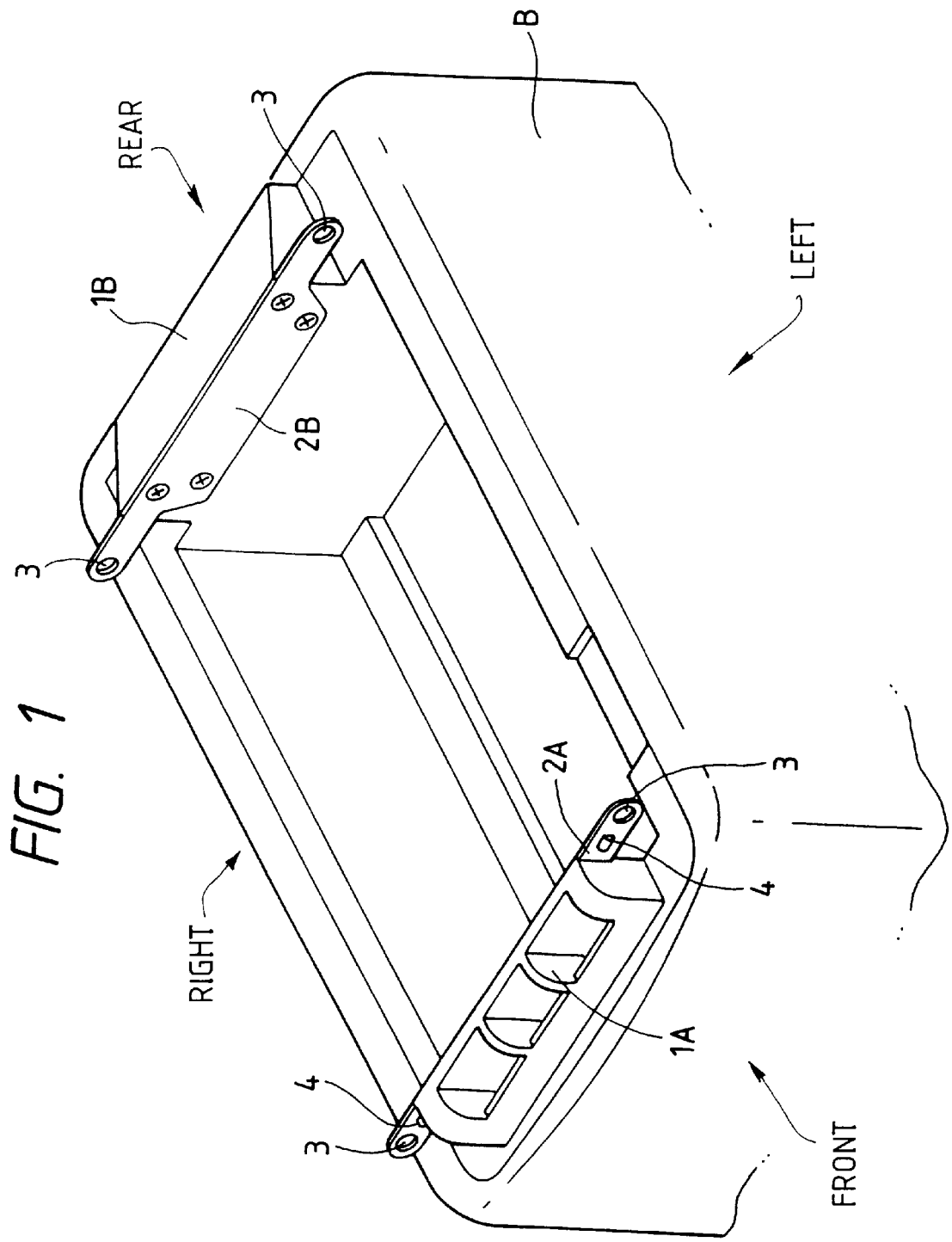
FIG. 1 is a perspective view showing the structure of the box body side of an opening and closing apparatus according to an embodiment of the present invention.

The invention will hereinafter be described in detail with respect to some preferred embodiments thereof shown in the drawings. An opening and closing apparatus for a lid according to a first embodiment has also been developed as an apparatus for opening and closing the lid of the console box of an automobile from two directions, and the feature thereof lies in that the following construction is adopted.

The body B side of the console box will first be described. In the present embodiment, as shown in FIG. 1, rising walls 1A and 1B are provided in the front and rear of the edge of the opening portion of the box body B, and a metallic bracket 2A formed with shaft holes 3 and beads 4 in the opposite end portions thereof is fixed to the rising wall 1A on the front side, and a metallic bracket 2B formed with only shaft holes 3 is fixed to the rising wall 1B on the rear side.

In FIG. 1, the left side is called the front and the right side is called the rear.

Also, in the present embodiment, the opposite end portions of the pair of front and rear brackets 2A and 2B which extend in a horizontal direction are utilized as means for cooperating with the corresponding edge portions of a lid L to hold the lid L in its fully opened state.

Figure 2:
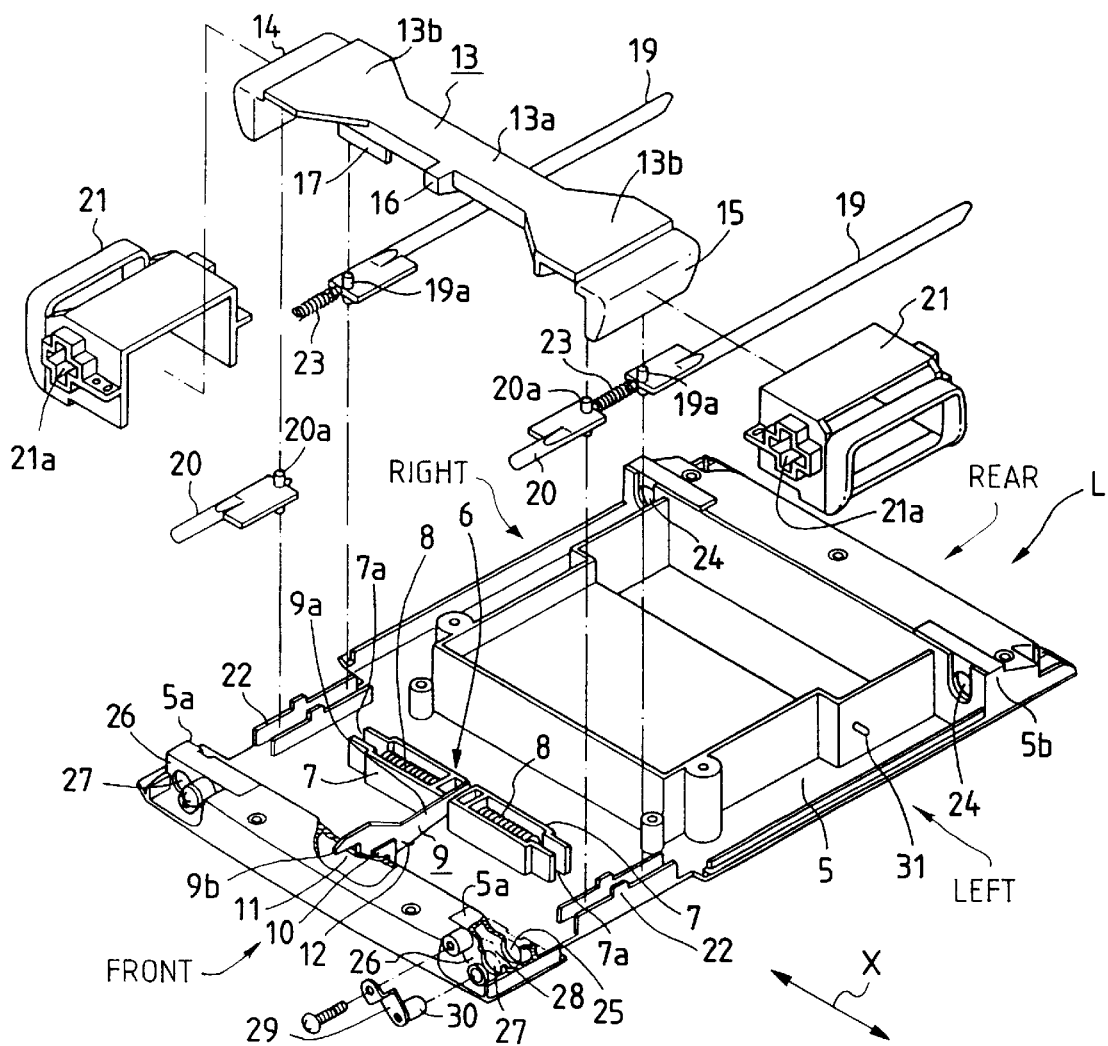
FIG. 2 is a partly exploded perspective view showing the structure of the lid side.

On the other hand, on the lid L side pivotally mounted to the opening portion of the box body B, as shown in FIG. 2, an area 6 in which a movable member 13 which will be described later is mounted for movement in the left to right direction is defined toward the front portion of a rectangular base plate 5 formed of synthetic resin, a pair of holding blocks 7 having guide ports 7a are provided on the bottom surface of the area 6 in a back-to-back state, and compression coil springs 8 for normally biasing the movable member 13 to a centering position are individually contained in the holding blocks 7, while a check lever 9 presenting a beak-like shape is pivotally supported near the back-to-back space between the holding blocks 7 through a supporting piece 10, one end portion 9a of this check lever 9 faces the back-to-back space between the holding blocks 7 and the other end portion 9b thereof faces outwardly from a window 11 opening to the front wall 5a side of the base plate 5, and one end portion 9a of the check lever 9 is upwardly biased by a torsion spring 12 until the other end portion 9b bears against the bottom of the window 11.

In FIG. 2, the left side is called the front, the right side is called the rear, the upper side is called the right, and the lower side is called the left.

Figure 3:
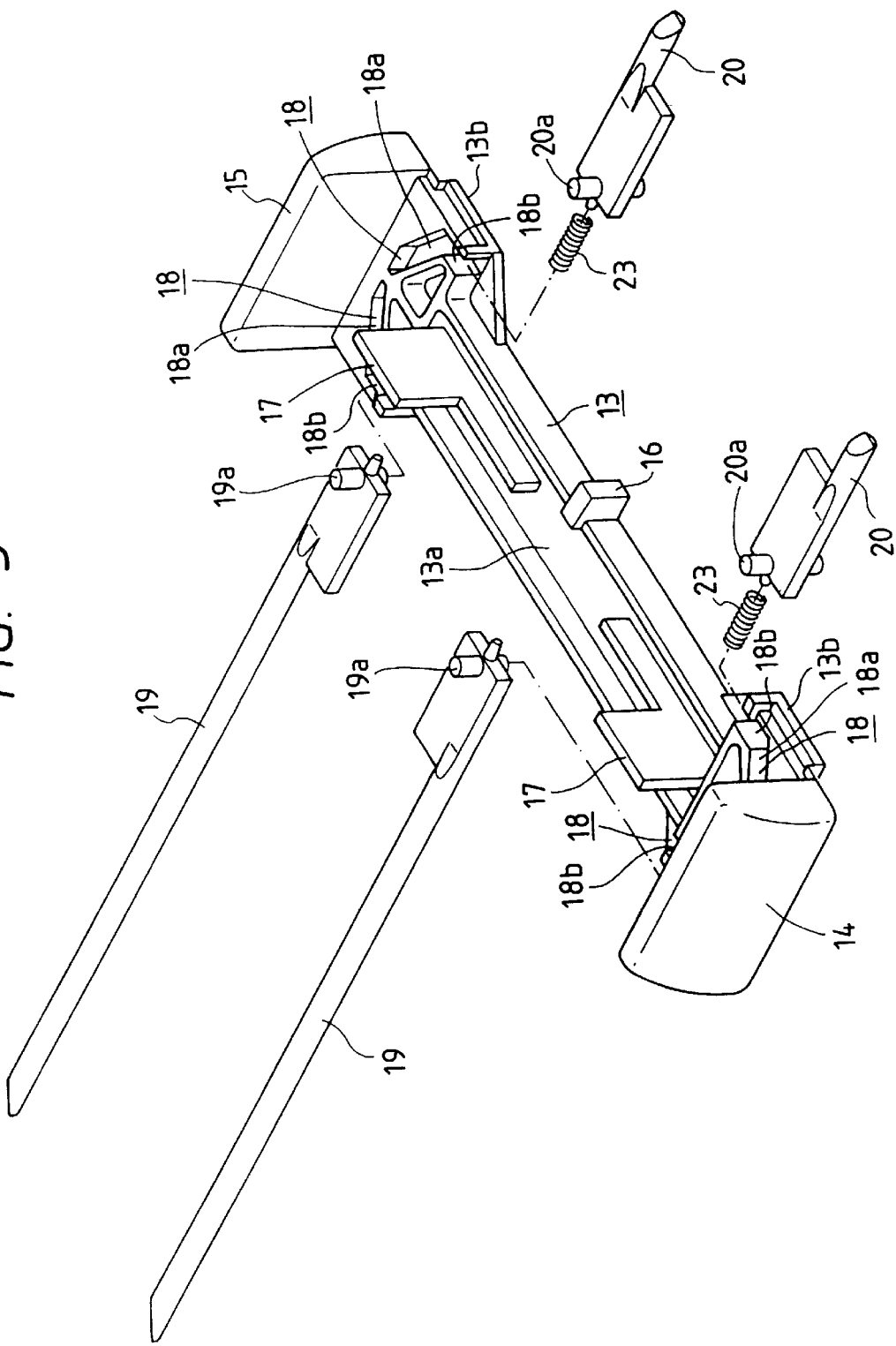
FIG. 3 is an exploded perspective view showing the relation among a movable member, an operating button and a hinge pin from the back side.

Also, the movable member 13, as shown in FIG. 3, is an integrally molded article of synthetic resin presenting a plate-like shape of which the intermediate portion 13a is narrow and the opposite end portions 13b are wide, and particularly in the present embodiment, a pair of left and right operating buttons 14 and 15 are integrally connected to the wide opposite end portions 13b from first, and a stopper projection 16 is formed on the central side of the narrow intermediate portion 13a, and a pair of leg pieces 17 for interfering with the compression coil springs 8 via the guide ports 7a of the pair of holding blocks 7 are formed on the underside of the intermediate portion 13a, and a pair of cam slots 18 each having a regulating portion 18a and a non-regulating portion 18b continuous to each other are formed in opposed relationship with each other in the undersides of the wide opposite end portions 13b.

The relation between the regulating portion 18a and the non-regulating portion 18b of each cam slot 18 is set so that in a state in which the pair of cam slots 18 are opposed to each other, as shown, the regulating portions 18a may present the shape of "∧" in which the interval width gradually narrows and the non-regulating portions 18b may present a parallel state maintaining an equal maximum interval width.

At a point of time whereat the lid L is closed, the check lever 9 has its other end portion 9b bearing the upper edge portion of the front side bracket 2A and has its one end portion 9a forcibly downwardly pivotally moved to a first position against the biasing spring pressure of the torsion spring 12 and therefore, when the lid L is closed, the stopper projection 16 of the movable member 13 is located above one end portion 9a to thereby permit the movable member 13 to be moved to the centering position, but when the movable member 13 is once moved to the right or the left by the pressing operation of the operating button 14 or 15 and the lid L is somewhat upwardly pivotally moved to thereby bring the other end portion 9b out of contact with the upper edge portion of the front side bracket 2A, the stopper projection 16 is now caused to bear against the side of one end portion 9a which has been upwardly pivotally moved to a second position by the biasing spring pressure of the torsion spring 12 to thereby lock the movable member 13 moved from the centering position in that state.

Also, the movable member 13 to which the pair of operating buttons 14 and 15 are connected is mounted on the area 6 of the already described base plate 5 for movement in the left to right direction with the followers 19a and 20a of a pair of long and short hinge pins 19 and 20 present on each side fitted in the cam slots 18 opposed to each other, and in this case, it is mounted through hollow decoration frames 21 screwed to the opposite sides of the area 6 of the base plate 5.

When one of the operating buttons 14 and 15 integrally connected to the movable member 13 is inwardly pressed, the pair of long and short hinge pins 19 and 20 present on the pressed side are moved toward each other by the action of the regulating portions 18a of the cam slots 18 opposed to each other which present the shape of and "∧" guide groove walls 22 provided on the base plate 5 side, but it never happens that the pair of long and short hinge pins 19 and 20 present on the opposite side are moved toward each other by the action of the non-regulating portions 18b of the cam slots 18 opposed to each other which present a parallel state.

In FIG. 2, the reference numeral 23 designates a spring member for biasing the pair of long and short hinge pins 19 and 20 present on each side away from each other, the reference numeral 24 denotes support holes for supporting the tip end portion of the long hinge pin 19 present on each side, the support holes 24 being formed in the opposite sides of the rear wall 5b of the base plate 5 correspondingly to the aforedescribed shaft holes 3 of the rear side bracket 2B, and the reference numeral 25 designates support holes for supporting the tip end portion of the short hinge pin 20 present on each side, the support holes 25 being formed in the opposite sides of the front wall 5a of the base plate 5 correspondingly to the shaft holes 3 of the front side bracket 2A.

Further, in the present embodiment, partition walls 26 each having a through-hole 27 are juxtaposed at predetermined intervals relative to the front wall 5a of the base plate 5, whereby a space 28 into which each end portion of the front side bracket 2A is fitted is defined between each partition wall 26 and the front wall 5a, and a boss 30 provided on the free end portion of a leaf spring 29 is made to resiliently face this space 28.

Also, in FIG. 2, the reference numeral 31 denotes a rib wall projectedly provided on the moving portion of the long hinge pin 19 on each side. The rib wall 31 bears against the side of the long hinge pin 19 to thereby flex the central portion of the long hinge pin 19 somewhat outwardly, and utilizes the reaction force thereof to eliminate the shaking of the long hinge pin 19 coming in and out without the use of unwoven fabric or the like, thereby effectively preventing the production of abnormal sound.

Consequently, in the present embodiment, via cruciform holes 21a formed in the opposite sides of the decoration frame 21, the followers 19a and 20a of the long and short hinge pins 19 and 20 on each side are engaged in the cam slots 18 formed in the undersides of the opposite end portion 13b of the movable member 13, with the spring member 23, and the movable member 13 is movably mounted in the area 6 of the base plate 5 through the two decoration frames 21 and a suitable cover member 32 is put on the base plate 5, whereby the lid L is assembled very simply and therefore, if thereafter the tip end portions of the pair of long and short hinge pins 19 and 20 present on each side are brought into the corresponding shaft holes 3 in the brackets 2A and 2B by the pressing operation or the like of the already described integral type operating buttons 14 and 15, it will become possible to pivotably mount the lid L on the box body B side, as in the prior-art apparatus.

Figure 4:
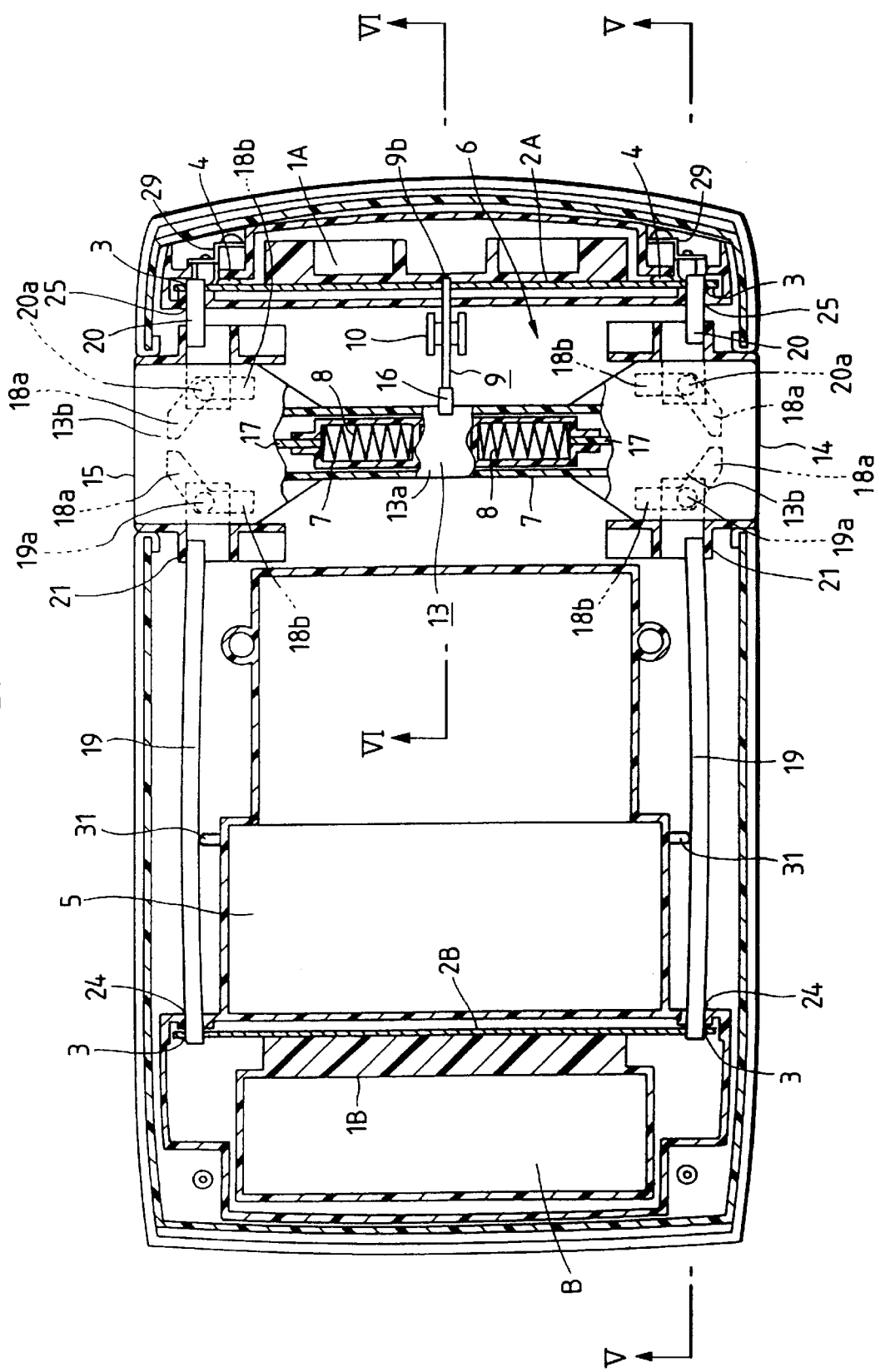
FIG. 4 is a transverse cross-sectional view taken along the line IV—IV of FIG. 5 and showing the closed state of a lid.
Figure 5:
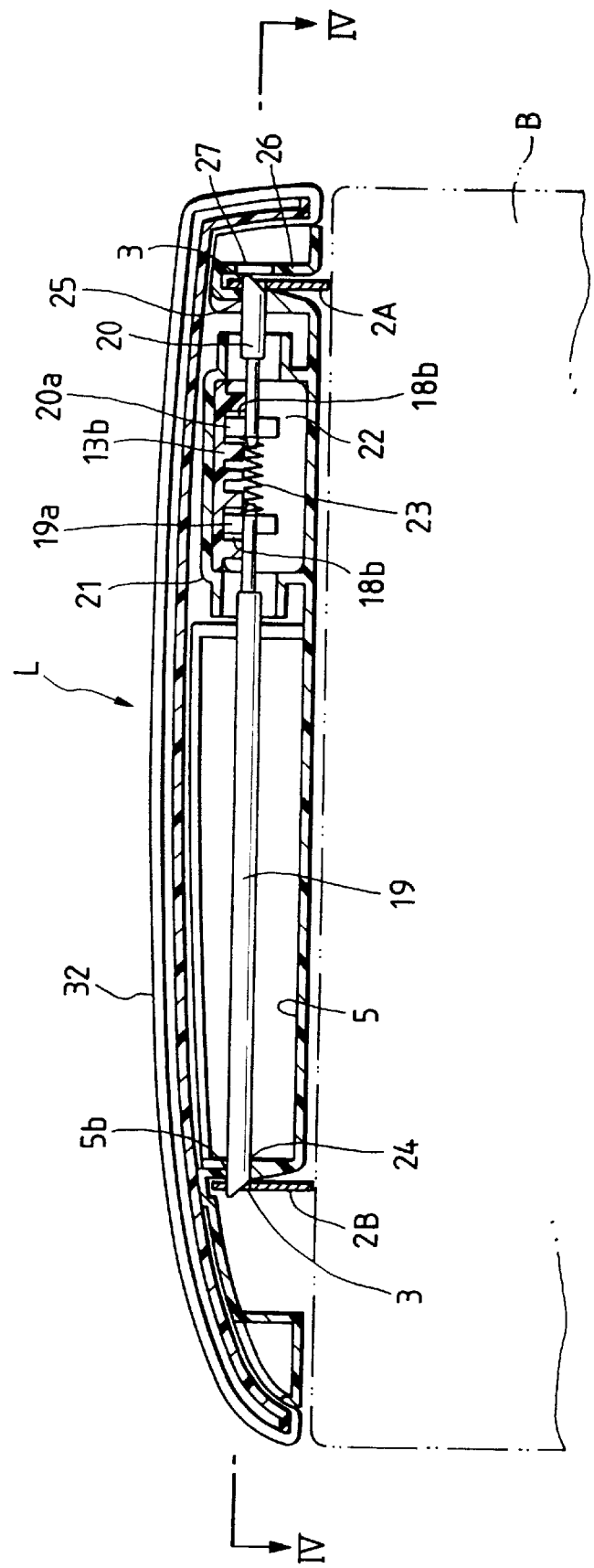
FIG. 5 is a longitudinal cross-sectional view taken along the line V—V of FIG. 4 and showing the closed state of the lid.

In such an opening and closing apparatus, when the lid L is in its closed state, as shown in FIGS. 4 and 5, the movable member 13 with which the operating buttons are integral is biased to the centering position in the area 6 of the base plate 5 by the spring pressure of the compression coil springs 8 contained in the pair of holding blocks 7 and therefore, the tip end portions of the pair of long and short hinge pins 19 and 20 present on each side are brought into the shaft holes 3 in the front and rear brackets 2A and 2B via the support holes 24 and 25, whereby a reliable closed state is ensured.

Figure 6:
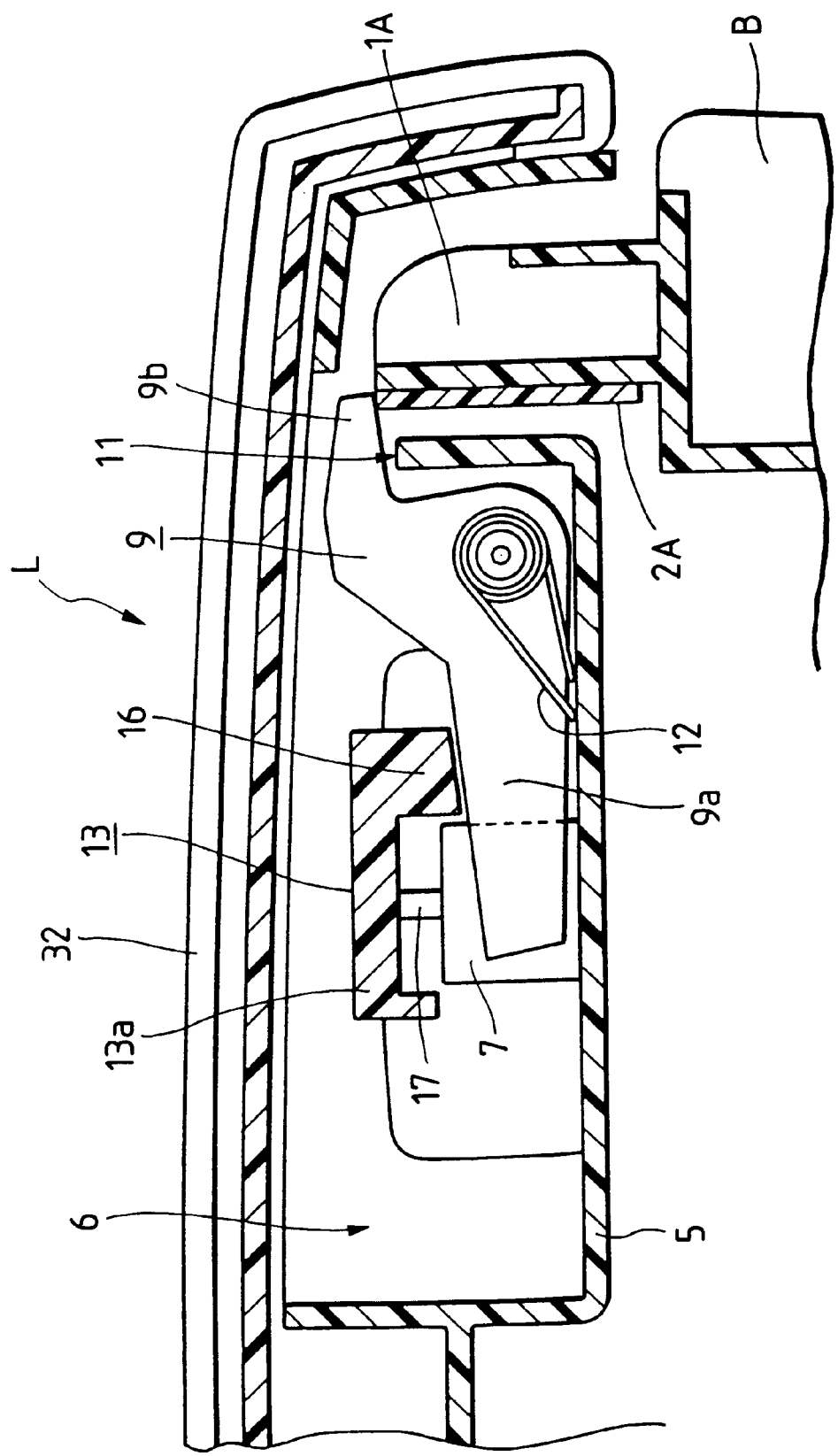
FIG. 6 is a cross-sectional view taken along the line VI—VI of FIG. 4 and showing the relation between a stopper projection and a check lever in the closed state of the lid.

In this closed state, the followers 19a and 20a of the pair of long and short hinge pins 19 and 20 are located in the boundaries between the regulating portions 18a and non-regulating portions 18b of the cam slots 18 opposed to each other, as shown, while on the other hand, the other end 9b of the check lever 9 bears against the upper edge portion of the front side bracket 2A to thereby pivotally move its own one end portion 9a downwardly against the spring pressure of the torsion spring 12 and therefore, the stopper projection 16 of the movable member 13 only overlies one end portion 9a of the check lever 9, as shown in FIG. 6.

Figure 7:
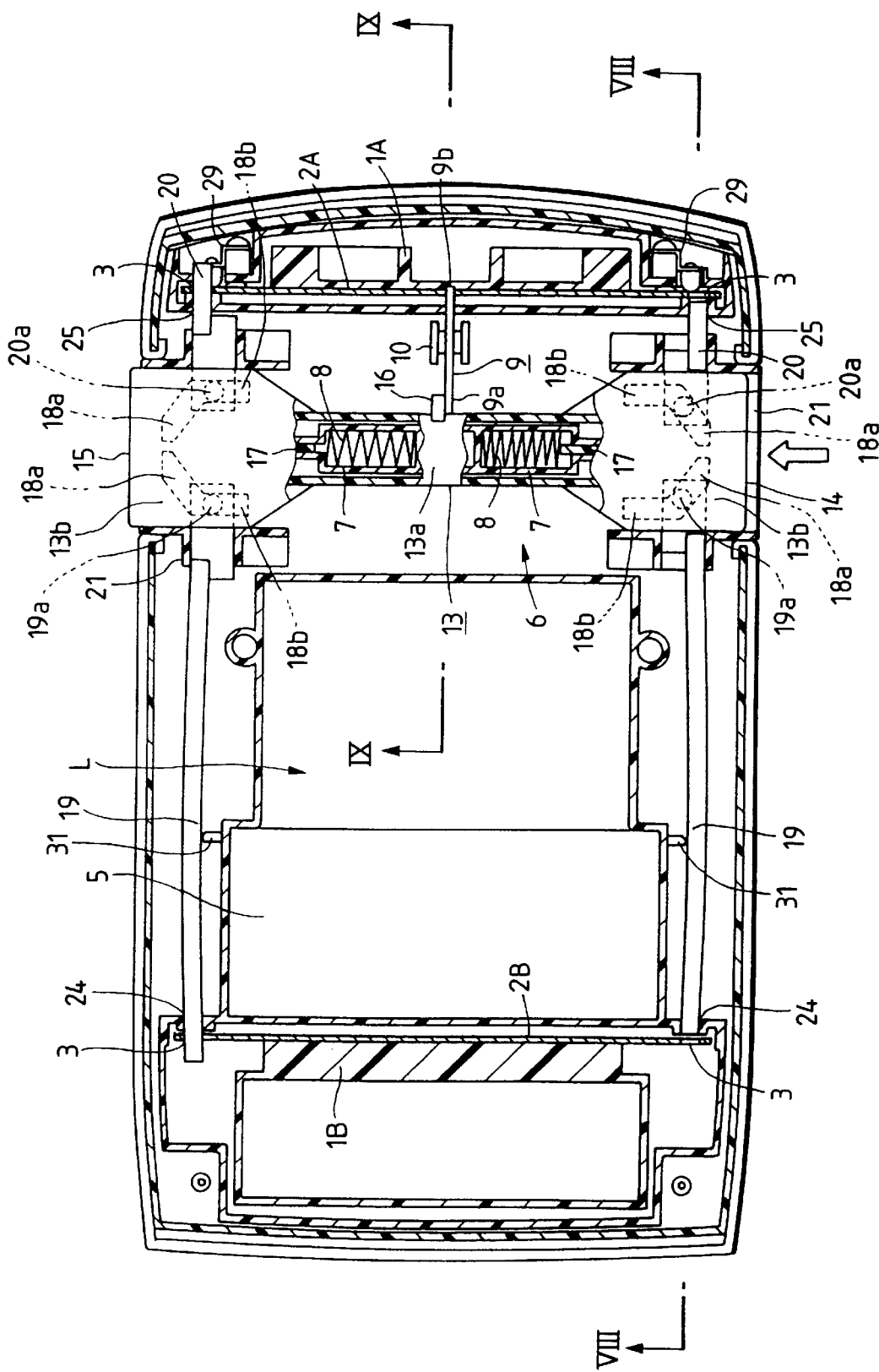
FIG. 7 is a transverse cross-sectional view taken along the line VII—VII of FIG. 8 and showing a state in which the right operating button has been pressed.
Figure 8:
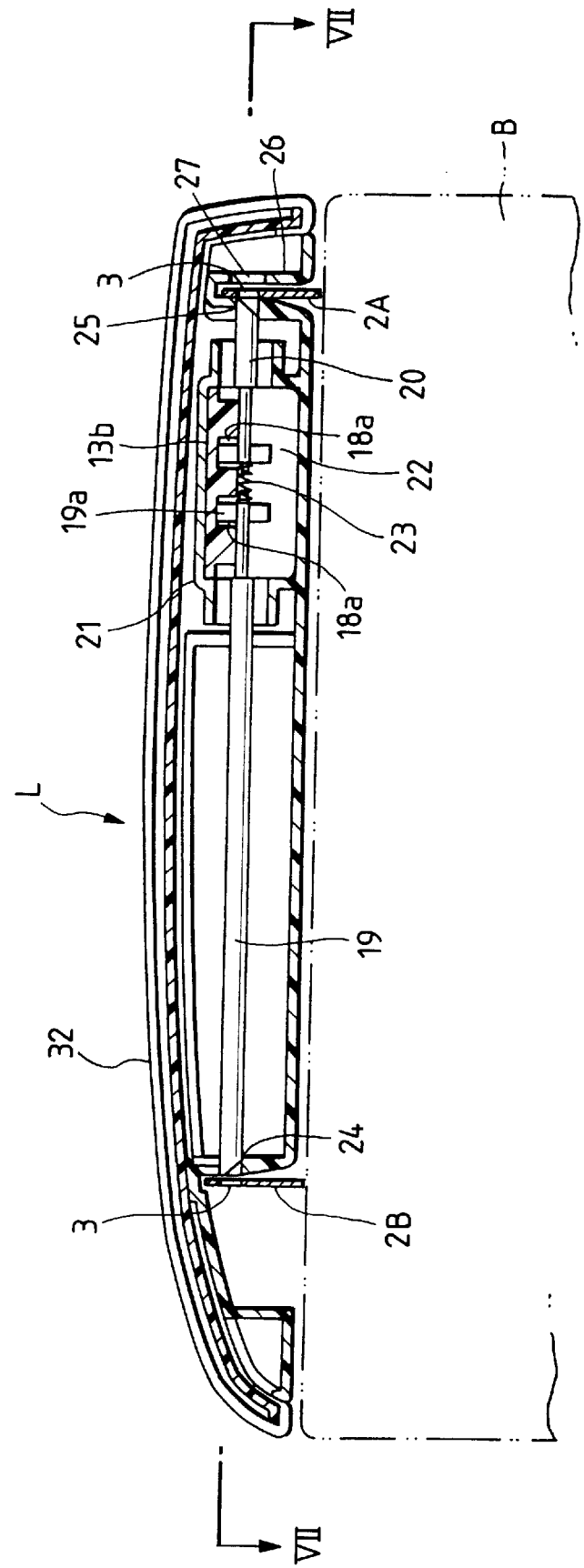
FIG. 8 is a longitudinal cross-sectional view taken along the line VIII—VIII of FIG. 7 and showing the state in which the right operating button has been pressed.

If in this closed state of the lid L, the lid L is to be leftwardly pivotally moved to open the opening portion of the box body B, the right operating button 14 is inwardly pressed against the spring pressure of the compression coil spring 8 contained in the holding block 7 on the same side, whereupon as shown in FIGS. 7 and 8, by the action of the regulating portions 18a of the cam slot 18 operatively associated with the pressing movement of the operating button 14 which present the shape of "∧", the pair of long and short hinge pins 19 and 20 present on the right side, i.e., the lower side as viewed in FIG. 7, come off the shaft holes 3 in the front and rear brackets 2A and 2B against the spring member 23.

At the point of time whereat the right operating button 14 has been inwardly pressed, the movable member 13 integral with this operating button 14 is of course moved in the same direction with the left operating button 15, as shown. However, the followers 19a and 20a of the pair of long and short hinge pins 19 and 20 present on the left side, i.e., the upper side as viewed in FIG. 7 are conversely directed into the non-regulating portions 18b of the cam slots 18 opposed to each other which present a parallel state and do not move toward each other, but yet it never happens that they move away from each other and therefore, it becomes unnecessary to use a strong force for the pressing operation of the right operating button 14 and as compared with the prior-art apparatus, the operability becomes very good.

Figure 9:
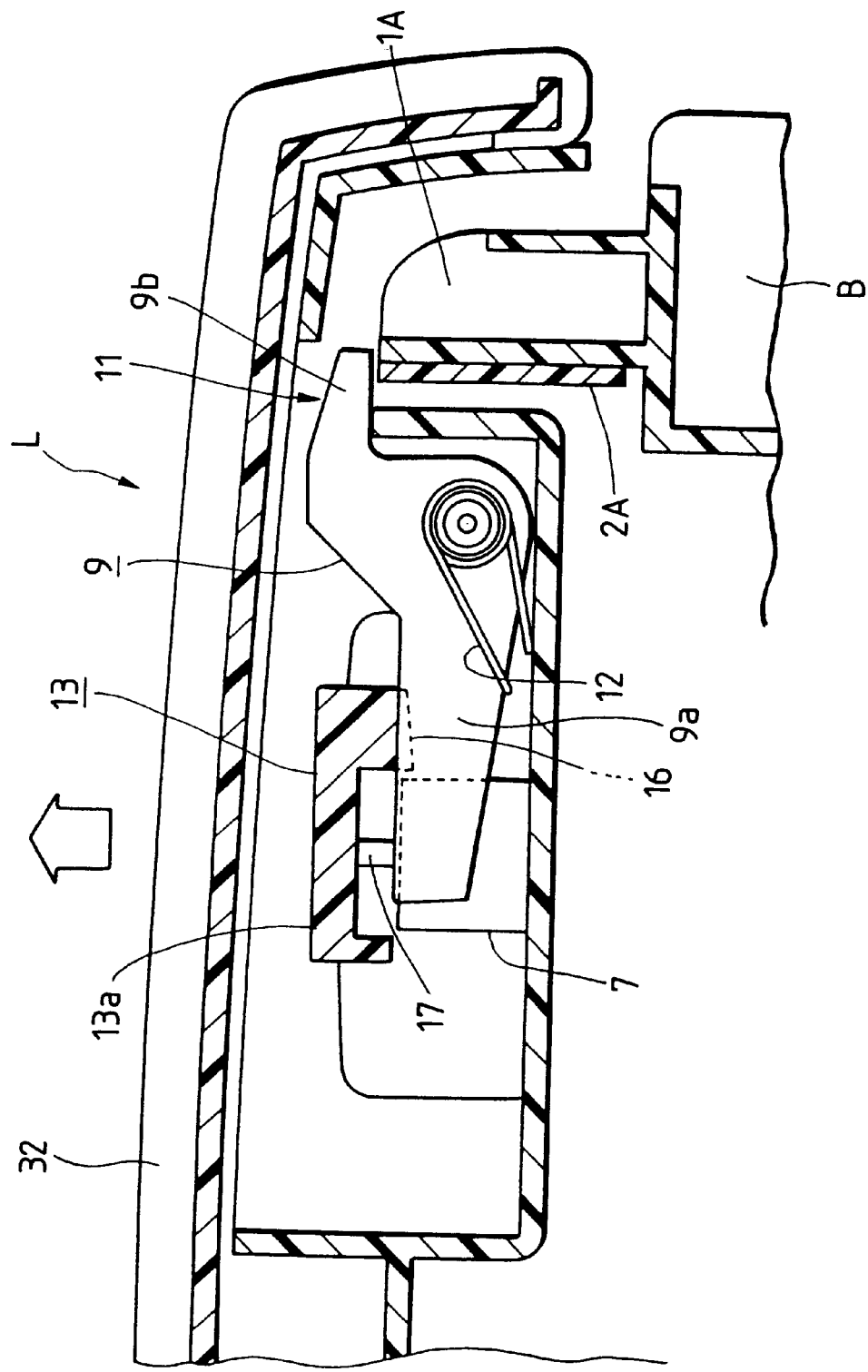
FIG. 9 is a cross-sectional view taken along the line IX—IX of FIG. 7 and showing the relation between the stopper projection and the check lever during the opening of the lid.

When the lid L is then somewhat upwardly pivotally moved while this operating button 14 remains pressed, the state in which the other end portion 9b of the check lever 9 is bearing against the upper edge portion of the front side bracket 2A is released on the spot as shown in FIG. 9, whereby one end portion 9a of the check lever 9 is upwardly pivotally moved by the spring pressure of the torsion bar 12 to thereby automatically cause the stopper projection 16 to bear against its own side. As a result, the movable member 13 is locked in that place against the spring pressure of the compression coil spring 8 which biases its to the centering position, and is reliably hampered from returning to the centering position.

Figure 10:
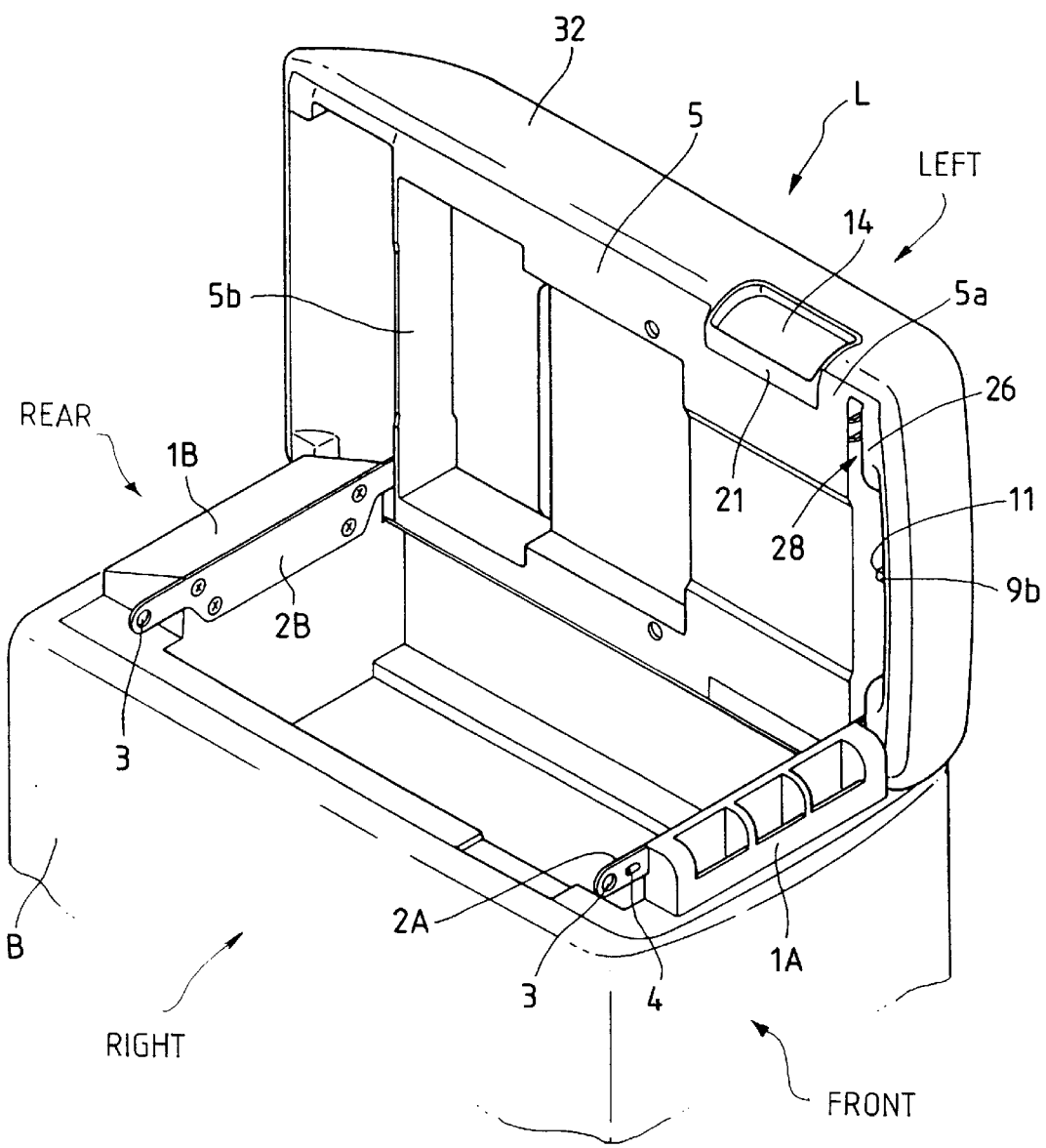
FIG. 10 is a perspective view showing a state in which the lid has been pivotally moved in an opening direction.

Accordingly, if thereafter the lid L is leftwardly pivotally moved about the pair of long and short hinge pins 19 and 20 engaged in the shaft holes 3 in the brackets 2A and 2B on the left side, the opening portion of the box body B can be opened as shown in FIG. 10.

Moreover, such opening operation of the lid L is free of the fear that after the lid L has been somewhat upwardly pivotally moved while the operating button 14 is pressed, the movable member 13 returns to the centering position with the operating button 14 if the operating button 14 is released and therefore, of course, the pivoting operation of the lid L also becomes convenient, but in this state, even if an attempt is made by mistake to inwardly press the left operating button 15, that pressing operation can be blocked by the stopper projection 16 bearing against one end portion 9a of the check lever 9 and thus, even if a lock shaft is not used as in the prior art, the lid L can be prevented from coming off the box body B side by a wrong operation.

Figure 11:
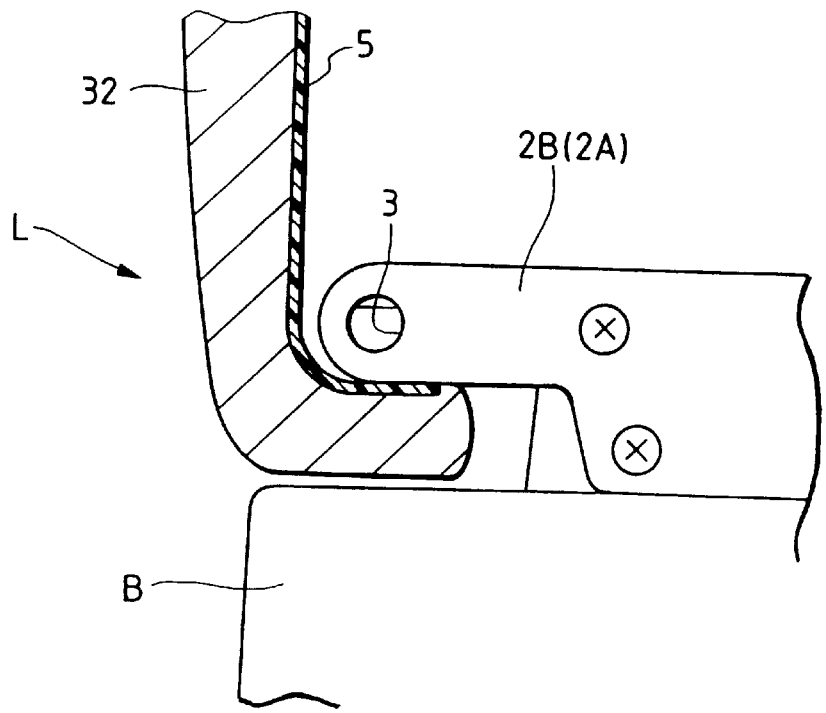
FIG. 11 is an illustration of essential portions showing a state in which the lid is held in its fully opened state.
Figure 12:
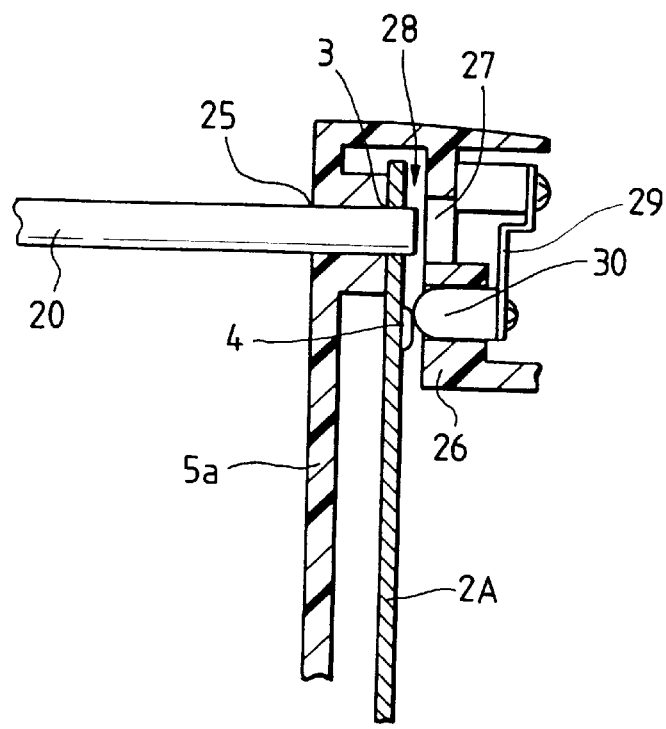
FIG. 12 is an illustration of essential portions showing a state in which the boss of a leaf spring is engaged with the bead of a bracket.

Also, in the present embodiment, when the opening portion of the box body B is in its opened state, even if a stopper arm, a hinge arm or the like for exclusive use is not used as in the prior art, the corresponding edge portions of the base plate 5 of the lid L are restrained on the lower edges of the end portions of the front and rear brackets 2A and 2B, as shown in FIG. 11, whereby the fully opened state of the lid can be reliably maintained and therefore, not only there is not the possibility that putting an article into and out of the box body B is hindered, but also the outward appearance of the apparatus is very much improved and in this fully opened state, as shown in FIG. 12, the boss 30 provided on the free end portion of the already described leaf spring 29 rides over the bead 4 of the front side bracket 2A and comes into resilient engagement therewith, whereby the fully opened posture of the lid L is reliably maintained.

When the lid L in this fully opened state is to be closed, the lid L is pivoted rightwardly about the pair of long and short hinge pins 19 and 20 engaged in the shaft holes 3 in the brackets 2A and 2B on the left side and the lid L is brought down until it bears against the edge of the opening portion of the box body B, whereupon now the other end portion 9b of the check lever 9 facing outwardly from the window 11 bears against the upper edge portion of the front side bracket 2A to thereby downwardly pivotally move one end portion 9a of the check lever 9 against the spring pressure of the torsion spring 12 and release the state of the stopper projection 16 bearing against the side thereof on the spot, whereby the movable member 13 is returned to the centering position by the spring pressure of the compression coil spring 8 with the pair of left and right operating buttons 14 and 15 and at the same time, in operative association therewith, the pair of long and short hinge pins 19 and 20 present on the right side are also automatically engaged from the supporting holes 24 and 25 into the corresponding shaft holes 3 in the brackets 2A and 2B by the action of the regulating portions 18a of the cam slots 18 and the action of the spring member 23 and thus, the lid L is closed.

Conversely, when the lid L is to be rightwardly pivotally moved to open the opening portion of the box body B, if although not specifically shown, the left operating button 15 is inwardly pressed against the spring pressure of the compression coil spring 8 contained in the holding block 7 on the same side, as in the aforedescribed case, the lid L is permitted to pivot rightwardly about the pair of long and short hinge pins 19 and 20 engaged in the shaft holes 3 in the brackets 2A and 2B on the right side and again in this case, at the point of time whereat the left operating button 15 has been inwardly pressed to thereby pivotally move the lid somewhat upwardly, one end portion 9a of the check lever 9 is upwardly pivotally moved by the spring pressure of the torsion spring 12 to thereby cause the stopper projection 16 of the movable member 13 to bear against the side of said one end portion 9a and therefore, the movable member 13 is hampered from being returned to the centering position by the spring pressure of the compression coil spring 8.

When the lid L in its opened state is to be closed, if as in the aforedescribed case, the lid L is brought down until it bears against the edge of the opening portion of the box body B, the other end portion 9b of the check lever 9 bears against the upper edge portion of the front side bracket 2A to thereby downwardly pivotally move one end portion 9a of the check lever 9 against the spring pressure of the torsion spring 12, whereby the movable member 13 is returned to the centering position and at the same time, in operative association therewith, the pair of long and short hinge pins 19 and 20 are again engaged in the corresponding shaft holes 3 in the brackets 2A and 2B.

Particularly, in the present embodiment, the check lever 9 is disposed in the central portion of the area 6 and is operated there and therefore, the lid L can be opened and closed from the left and right directions with the same accuracy while the compactness thereof is contrived, and this leads to the advantage that the irregularity of the operating force, the quality of sound, etc. during the opening and closing of the lid can be prevented and the feeling of a high quality is obtained and also the check lever can cooperate with the stopper projection 16 of the movable member 13 to reliably control the movement of the movable member 13. Also, since one end portion 9a of the check lever 9 extends in the back-to-back space between the holding blocks 7, the axial positioning of the check lever 9 becomes possible, and this point can also contribute to the reliability of the operation of the apparatus.

The axial positioning is intended to mean the positioning of the check lever 9 in a direction indicated by the double-headed arrow X in FIG. 2. The end portion 9a of the check lever 9 extends into a narrow space between the holding blocks 7. The check lever 9 can upwardly and downwardly move in the narrow space slidably. Therefore, the end portion 9a is guided by the end walls of the holding blocks 7 to be accurately positioned in the X direction. If the positioning of the end portion 9a is inaccurate in the X direction, a positional relationship described later in conjunction with FIGS. 26A to 26F is misaligned so that the lid malfunctions. Therefore, the accuracy of the position of the check lever 9 is important.

As described above, by the adoption of the above-described construction, the present invention makes it unnecessary to use, in addition to a lock shaft, individually operated in dependent parts for the pair of right and left operating buttons and the lock means therefor as in the prior art and therefore, it has become possible to achieve the curtailment of the number of parts and the resulting simplification of accessory mechanisms, and provide a compact and inexpensive opening and closing apparatus for the first time.

Moreover, the possibility of achieving the downsizing of the apparatus is accompanied by the possibility of the effective utilization of the space on the box body side and in this point as well, there is obtained a great actual benefit.

Further, there can also be provided the advantage that the pressing operation of the operating buttons becomes easy and the shaking of the hinge pins can be effectively prevented.

A second embodiment of the present invention will hereinafter be described.

The opening and closing apparatus for a lid according to the first embodiment is of a construction in which a pair of right and left operating buttons are integrally connected to the opposite end portions of a movable member having a stopper projection, the movable member is normally biased to the centering position by the spring pressure of a compression coil spring, while a check lever is pivotally supported at a location opposed to the stopper projection of the movable member and one end portion of the check lever is made to face the stopper projection side and the other end portion thereof is made to face outwardly from a window formed in a lid, and one end portion of the check lever is upwardly biased by the spring pressure of a torsion spring until the other end portion bears against the bottom of the window, and hinge pins present on both sides are connected to the opposite end portions of the movable member.

Therefore, in the first embodiment, when the lid is to be closed, the other end portion of the check lever facing outwardly from the window interferes with the box body side and one end portion thereof is downwardly pivotally moved against the spring pressure of the torsion spring, whereby the stopper projection of the movable member is positioned above one end of the check lever to thereby limit the movable member to move to the centering position with the pair of operating buttons, and when the lid is to be opened, the interference of the other end portion with the box body is released and one end portion of the check lever is upwardly pivotally moved by the spring pressure of the torsion spring, and the stopper projection of the movable member moved from the centering position is brought into engagement with one end portion of the check lever, whereby the movable member can be locked in that place against the biasing spring pressure and thus, as compared with the prior-art apparatus, the number of parts can be curtailed, and this can contribute to the simplification of the apparatus itself.

Also, when the lid is to be closed after it has been opened, if the lid is pressed against the box body side, the other end portion of the check lever again interferes with the box body side and therefore, now one end portion of the check lever downwardly pivots against the spring pressure of the torsion spring to thereby release the engagement thereof with the stopper projection.

As a result, the movable member is permitted to be returned to the centering position by the spring pressure of the compression coil spring, and the hinge pins on the closing side remain engaged in the shaft holes in the box body, while the hinge pins on the opening side are again engaged in the corresponding shaft holes in the box body in operative association with the return of the movable member and therefore, the engagement of the hinge pins on the right and left sides into the shaft holes is ensured.

Figure 13:
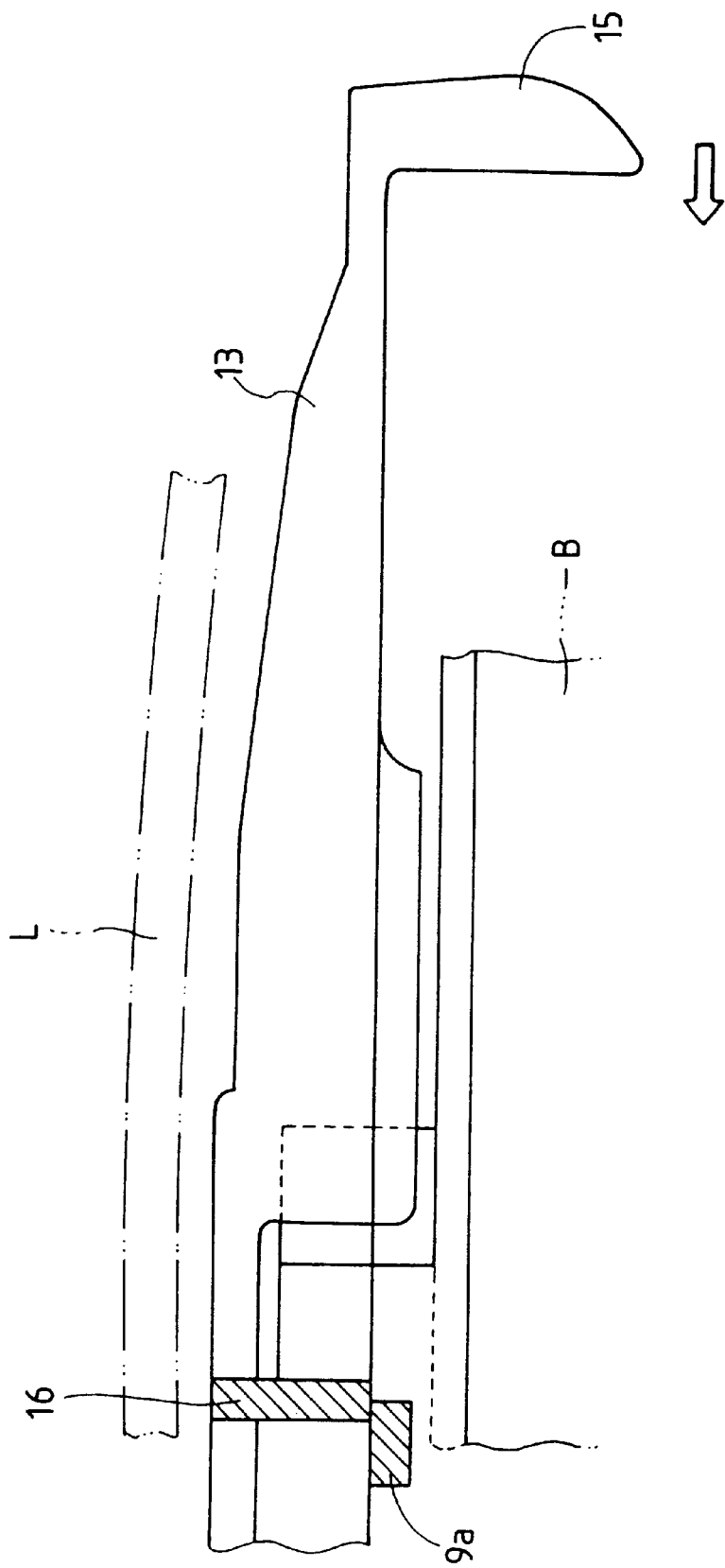
FIG. 13 is an illustration showing a state in which in a first embodiment, the upper surface of one end portion of the check lever and the lower surface of the stopper projection are caught by each other.

In the first embodiment, however, if the force with which the lid L is pressed into its fully closed position is weakened at a point of time whereat the movable member 13 has started to move toward the centering position, one end portion 9a of the check lever 9 is upwardly pivotally moved by the spring pressure of the torsion spring 12, as shown in FIG. 13, and the upper surface of one end portion 9a of the check lever 9 is caught by the lower surface of the stopper projection 16 with the spring pressure of the torsion spring 12.

When in this state, there is established the relation that $F1*\mu > F2$, where $\mu$ is the coefficient of friction of the relative sliding surface of the two 16 and 9a, F1 is the spring pressure of the torsion spring 12 and F2 is the spring pressure of the compression coil spring 8, the movable member 13 is locked on the spot and is hampered from returning to the centering position and therefore, due to this, the hinge pins on the opening side become unable to be engaged in the corresponding shaft holes and thus, the completely closed state of the lid cannot be obtained.

Also, in this state, one end portion 9a of the check lever 9 and the stopper projection 16 are not completely engaged with each other, but the upper surface of one end portion 9a is only caught by the lower surface of the stopper projection 16 and therefore, it becomes possible to move the movable member 13 in either direction by the pressing operation of the pair of operating buttons.

Figure 14:
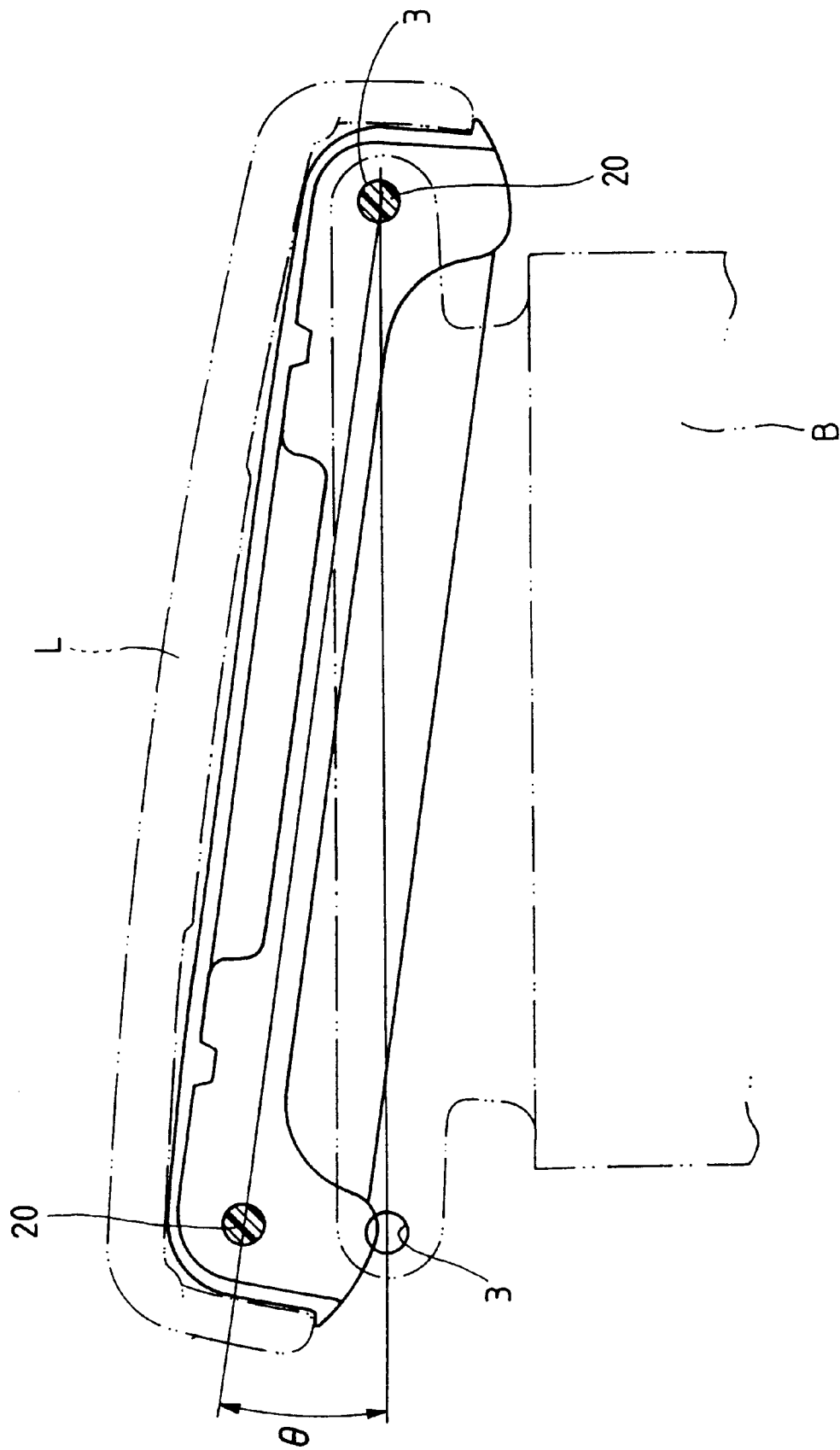
FIG. 14 is an illustration of essential portions showing a state in which in the first embodiment, the lid has been pivotally moved to a position in which a hinge pin on the opened side becomes separate from around a shaft hole in the box body.

Therefore, when as shown, for example, in FIG. 14, the lid L is somewhat upwardly pivotally moved by an angle θ from the above-described state to a position in which the hinge pin 20 on the opening side, i.e., the left side as viewed in FIG. 14, becomes separate from the shaft hole 3 in the box body B and in that position, now the operating button 15 on the closing side, i.e., the right side as viewed in FIG. 14, is pressed, the movable member 13 is moved in the direction of pressing with the operating button 15 because the stopper projection 16 is not restrained by one end portion 9a of the check lever 9.

When the movable member 13 is moved, now the hinge pin 20 on the closing side, i.e., the right side as viewed in FIG. 14, comes off the corresponding shaft hole 3 and at the same time, the hinge pin 20 on the closing side, i.e., the left side as viewed in FIG. 14, is axially outwardly moved, but this axially moved position is separated from the corresponding shaft hole 3 and therefore, the hinge pin 20 on the opening side becomes unable to be engaged in the shaft hole 3 and as a result, all the right and left hinge pins 20 come off the corresponding shaft holes 3 and thus, there may arise a situation in which the lid L comes off the box body B.

The second embodiment which will hereinafter be described can solve such problem.

The opening and closing apparatus for a lid according to the second embodiment has also been developed as an apparatus for opening and closing the lid of the console box of an automobile from two directions, and basically premises the aforedescribed first embodiment.

So, the body B side of the console box will first be described. The second embodiment, as shown in FIG. 15, is of a construction in which rising walls 101A and 101B are provided before and behind the edge of the opening portion of the box body B and metallic brackets 102A and 102B formed with shaft holes 103 in the opposite end portions thereof are fixed to the opposed surfaces of the rising walls 101A and 101B.

Thus, the shaft holes 103 in the front and rear brackets 102A and 102B lie in a state in which they are parallel to each other with the opening portion of the box body B interposed therebetween. However, the form of the shaft holes (concave hole portions) 103 is not restricted to a through type, but may also be any concave shape into which the chamfered tip end portions 128b and 129b of hinge pins 128 and 129 which will be described later can be engaged, and at least, it is to be understood that irrespective of the size thereof, the shaft holes have outline edges 103a against which the chamfered tip end portions 128b and 129b of the hinge pins 128 and 129 can resiliently bear.

Figure 15:
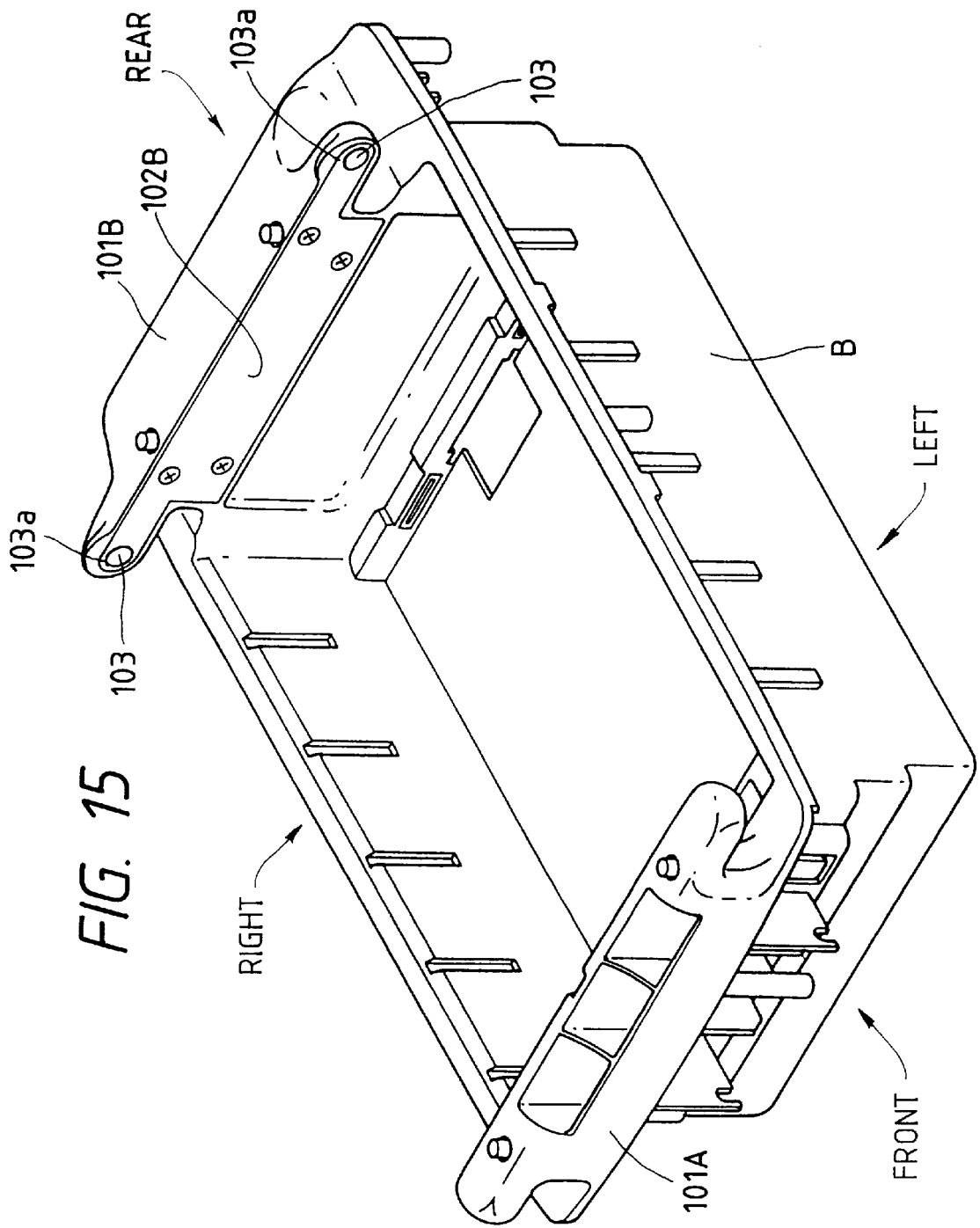
FIG. 15 is a perspective view showing the box body side structure of an opening and closing apparatus according to a second embodiment of the present invention.

In FIG. 15, the left side is called the front, the right side is called the rear, the upper side is called the right, and the lower side is called the left.

Figure 16:
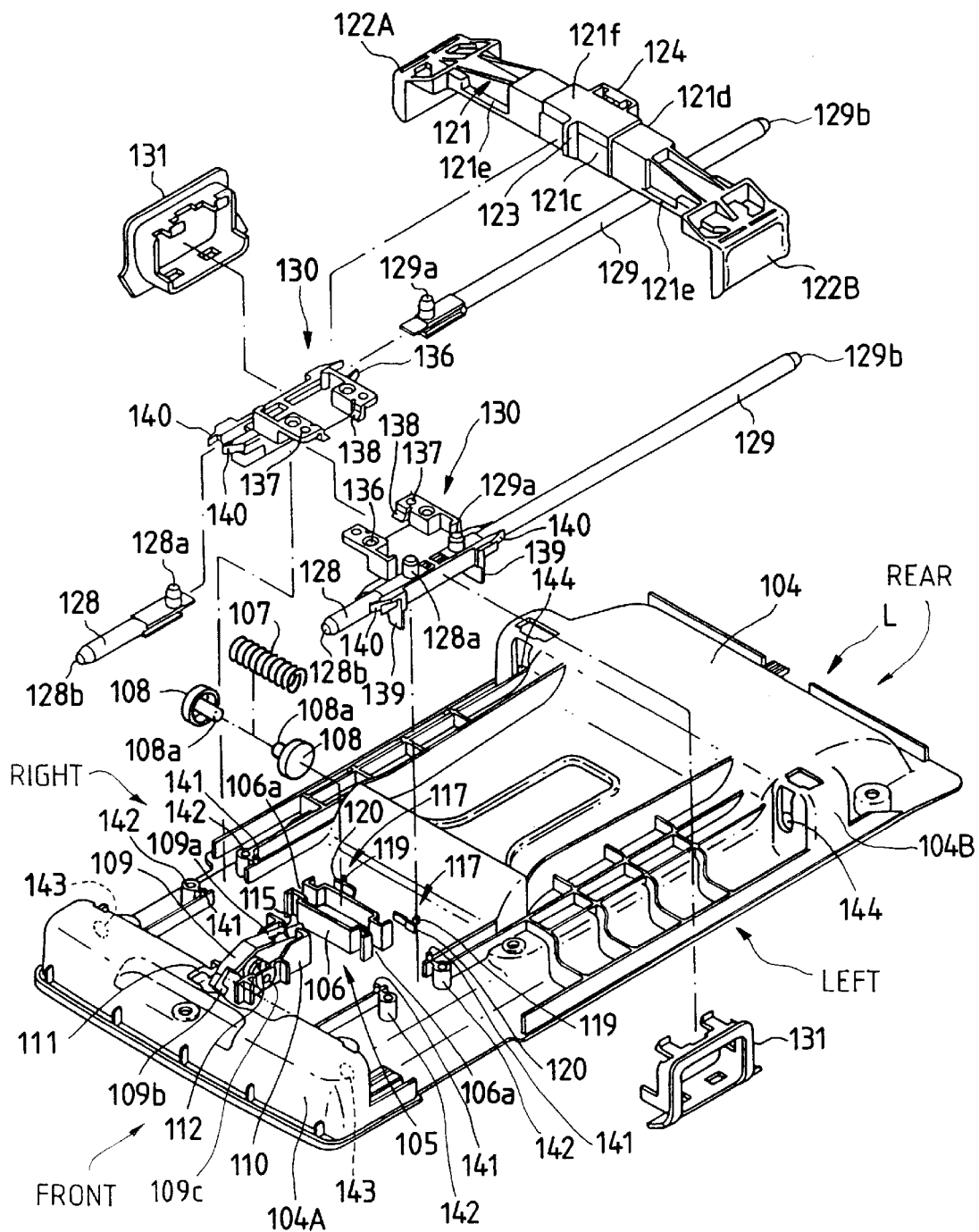
FIG. 16 is a partly exploded perspective view showing the structure of the lid.

On the other hand, the lid L pivotably mounted to the opening portion of the box body B is of a construction as shown in FIG. 16 wherein an area 105 in which a movable member (link means) 121 to be described is mounted for movement in the left to right direction is positively defined toward the front portion of a rectangular base plate 104 formed of synthetic resin, and a holding block 106 having two oppositely facing guide ports 106a substantially in the central portion of the area 105 and opening at the upper portion thereof, and a compression coil spring (first biasing means) 107 for normally biasing the movable member 121 to the centering position is contained in the holding block 106. Caps 108 having fitting projections 108a are attached to the opposite end portions of the compression coil spring 107 to thereby prevent the buckling of the compression coil spring 107.

Also, a beak-shaped check lever (control means) 109 is pivotably supported near one side of the holding block 106 through a pivot shaft 109c and a support wall 110, one end portion 109a of the check lever 109 faces the holding block 106 side, the other end portion 109b of the check lever 109 faces outwardly from within a window 111 formed in the front wall of the base plate 104, and one end portion 109a of the check lever 109 is upwardly biased by a torsion spring (second biasing means) 112 until the other end portion 109b bears against the bottom of the window 111. It is to be understood that for one end portion 109a of the check lever 109, as shown in FIGS. 26A to 26F, vertical surfaces 113 are formed on both sides of the lower portion thereof and tapered surfaces 114 continuous from the vertical surfaces 113 are formed on both sides of the upper portion thereof and said one end portion 109a is supported through a guide slit (side supporting portion) 115 formed in that side of the support wall 110 which is adjacent to the holding block 106.

Figure 17A:
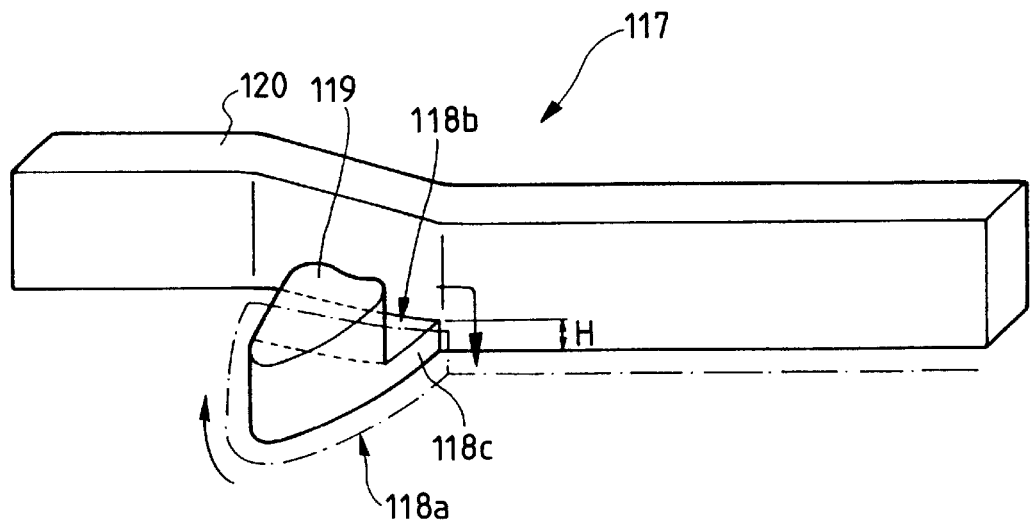
FIG. 17A is a perspective view of essential portions showing the structure of a guide cam.
Figure 17B:
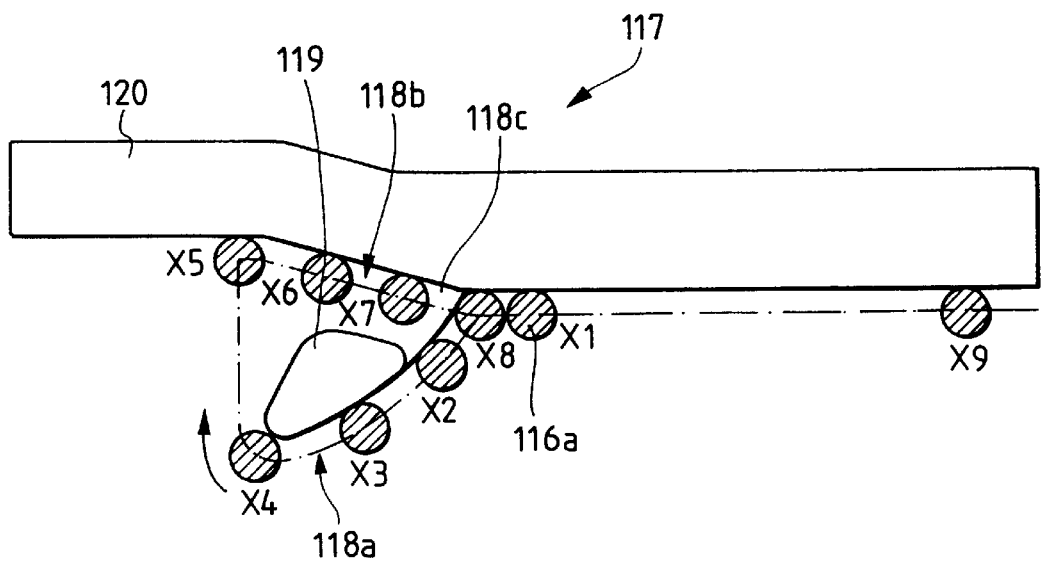
FIG. 17B is a plan view of essential portions showing the relation between the guide cam and the bent tip end portion of a spring bar.

Further, it is to be understood that two guide cams 117 for guiding the movement of the pair of bent tip end portions 116a of a spring bar 116 which will be described later are bisymmetrically provided on the opposite side of the check lever 109 in the area 105. The bisymmetrical guide cams 117, as shown in FIGS. 17A and 17B, are of a construction in which an outward path 118a and a return path 118b for guiding the movement of each bent tip end portion 116a are defined through a reversing projection 119 and an inclined portion 118c gradually rising from the inlet side to the outlet side of the outward path 118b is imparted to the bottom surface of the outward path 118b and the level difference H of the terminating portion of the inclined portion 118c is utilized to prevent the bent tip end portion 116a of the spring bar 116 from entering the return path 118b earlier by mistake and to cause the bent tip end portion 116a to resiliently bear against the bottom surface of the base plate 104 after it has passed said terminating portion. Also, particularly on the return path 118b side, a long guide wall 120 is uprightly provided at a predetermined distance from the reversing projection 119, and the movement of the tip end portion 116a of the spring bar 116 in the return path 118b may be guided through this guide wall 120.

Figure 18:
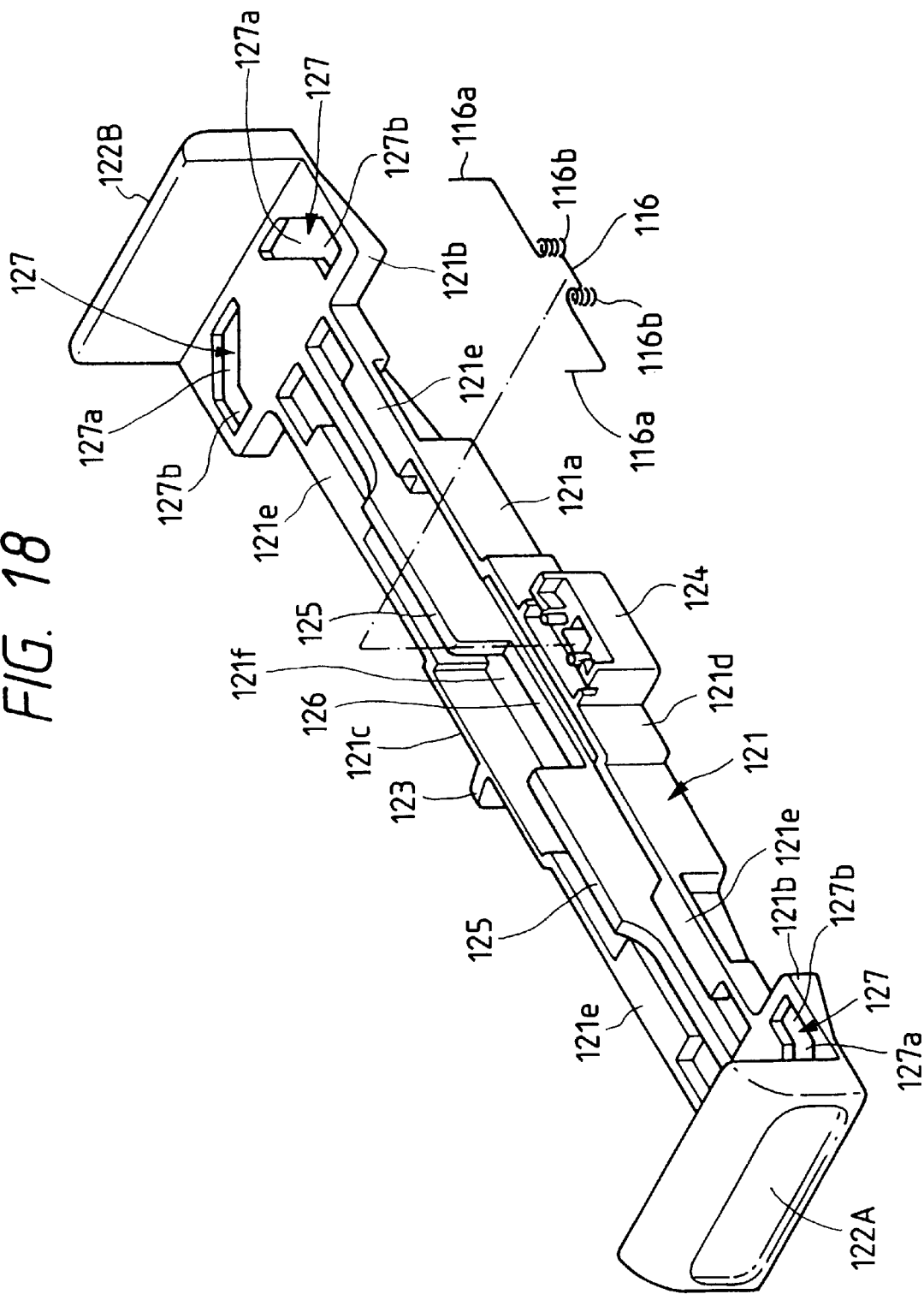
FIG. 18 is a partly exploded perspective view showing only a movable member from the back side thereof.

The already described movable member 121, as shown in FIG. 18, is an integrally molded article of synthetic resin of which the intermediate portion 121a is narrow and the opposite end portions 121b are wide, and is of a construction in which a pair of left and right operating buttons (operating means) 122A and 122B are integrally connected to the wide opposite end portions 121b and a stopper projection (control means) 123 is formed on the side wall 121c of the narrow intermediate portion which is opposed to the check lever 109, and a holder wall 124 is integrally formed on the side wall 121d of the intermediate portion 121a which is opposed to the guide cam 117, and the spring bar 116 having their opposite end portions 116a bent into an L-shape and having coil portions 116b at two intermediate locations is fixed to the holder wall 124.

Also, flange portions 121e for restraining the tentatively assembling resilient pawl 138 of a guide member 130 which will be described later are formed on the opposite sides of the intermediate portion 121a which are toward the opposite end portions 121b.

In addition, for the center of the lower surface of an upper wall 121f which defines the intermediate portion 121a with the opposite side walls 121c and 121d, there is formed a pair of leg pieces 125 interfering with the opposite end portions of the compression coil spring 107 through a cap 108 via the guide ports 106a of the holding block 106, and a rib wall 126 facing the upper opening side of the holding block 106 is formed between the leg pieces 125, and a pair of cam slots (link means) 127 each having a regulating portion 127a and a non-regulating portion 127b continuous to each other are formed in opposed relationship with the wide opposite end portions 121b.

The relation between the regulating portion 127a and non-regulating portion 127b of each cam slot 127 is set such that in a state in which the pair of cam slots 127 are opposed to each other, as shown, the regulating portions 127a present the shape of "∧" of which the interval width gradually narrows and the non-regulating portions 127b present a parallel state with the same maximum interval width.

The movable member 121 is mounted in the area 105 of the already described base plate 104 for movement in the left to right direction with the followers 128a and 129a of a pair of long and short hinge pins 128 and 129 present on each side fitted in the opposed cam slots 127, and in the present embodiment, it is to be understood that the movable member is mounted through two guide members 130 and two decoration frames 131 fixed to the opposite sides of the area 105 of the base plate 104. Further, it is to be understood that the tip end portions 128b and 129b of the long and short hinges 128 and 129 are chamfered.

Figure 19A:
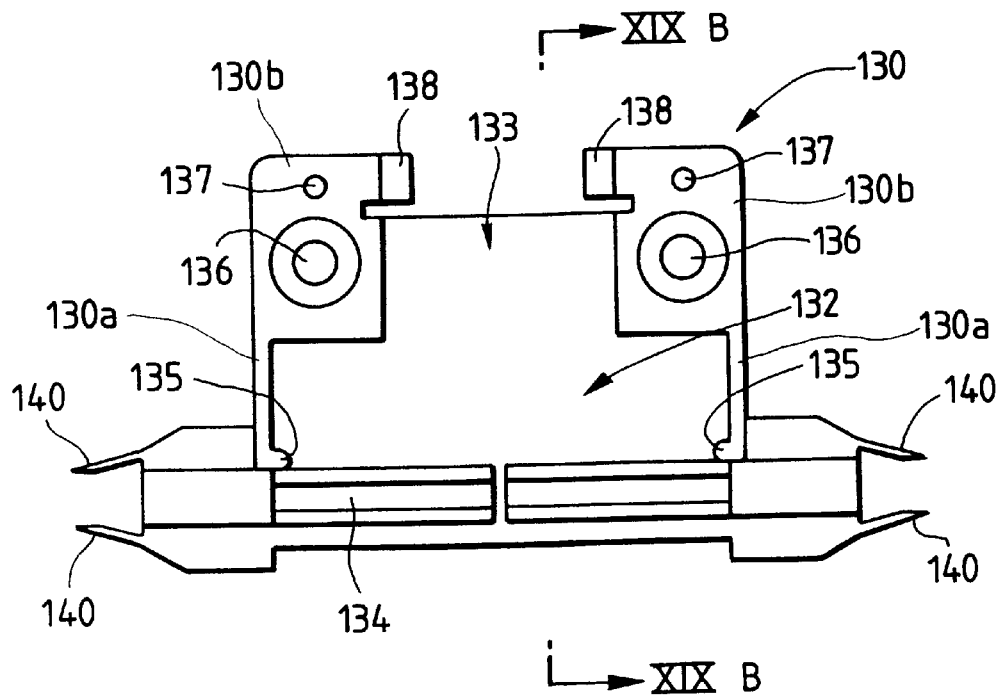
FIG. 19A is a plan view of a guide member.
Figure 19B:
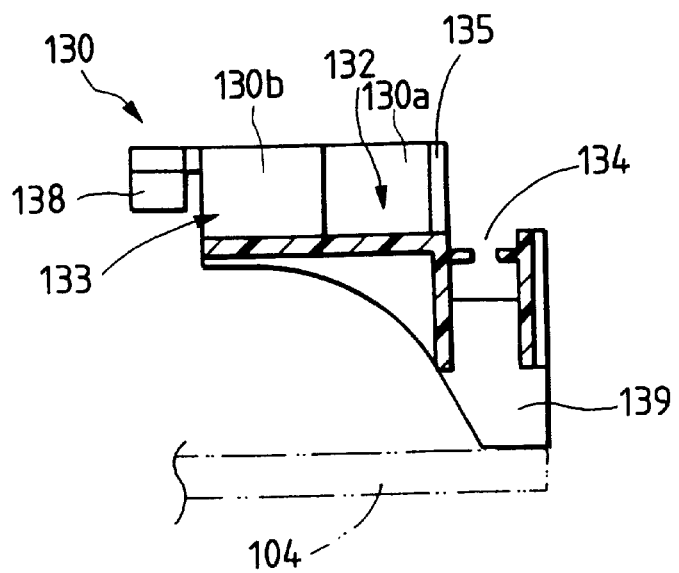
FIG. 19B is a cross-sectional view of the guide member taken along the line XIXB—XIXB of FIG. 19A.

Particularly, the guide member 130 is integrally formed into a block member of synthetic resin, and as shown in FIGS. 19A and 19B, on the inner side, it has a void 132 for permitting the movement of the wide end portions 121b of the movable member 121, and a void 133 for permitting the movement of the narrow intermediate portion 121a of the movable member 121, and on the outer side, it is provided with guide groove portions 134 for the long and short hinge pins 128 and 129 which are orthogonal to the voids 132 and 133, and a pair of guide projections 135 for slidably contacting with and guiding the outer edges of the wide end portions 121b of the movable member 121 formed with a cam slot 127 are projectedly provided at locations most proximate to the guide groove portions 134 of two side walls 130a defining the void 132, and a screw hole 136 and a positioning hole 137 having a relation of pair are formed in two side walls 130b defining the void 133, and a pair of tentatively assembling resilient pawls 138 engaged with the flange portion 121e of the movable member 121 are obliquely provided on the innermost portions of the side walls 130b.

Also, a pair of posture holding pieces 139 bearing against the inner surfaces of the opposite sides of the base plate 104 are vertically provided on the lower surfaces of the guide groove portions 134 in a somewhat further outwardly protruding state, and resilient vanes 140 in a relation of pair extend on the opening edges of the opposite ends of the guide groove portions 134.

Thus, the guide member 130 is such that the guide projection 135 of the movable member 121, the guide groove portions 134 of the hinge pins 128, 129 and the posture holding pieces 139 are located in succession outwardly from the screw hole 136 fixed to the base plate 104.

The long and short hinge pins 128 and 129 are supported for movement back and forth in the guide groove portions 134 of the guide members 130, and when the opposite end portions 121b and intermediate portion 121a of the movable member 121 are pushed into the corresponding voids 132 and 133 while the followers 128a and 129a of the hinge pins 128 and 129 are fitted into the cam slots 127, the tentatively assembling resilient pawls 138 come into engagement with the flange portions 121e of the intermediate portion 121a, whereby the movable member 121 and the long and short hinge pins 128 and 129 can be tentatively assembled to the guide member 130 on each side at a time.

So, thereafter, if a small boss 141 provided on the base plate 104 side is fitted into the positioning hole 137 and each guide member 130 is screwed to a large boss 142 provided on the base plate 104 side, by the utilization of the screw hole 136, the guide members 130 will be fixed to the base plate 104 and at the same time, the movable member 121 will be movably mounted in the area 105.

In such a state, as shown in FIG. 19B, the lower end edges of the posture holding pieces 139 bear against the inner surface of the base plate 104 to thereby effectively prevent the forward falling of the guide members 130 themselves, whereby the supporting rigidity of the guide groove portions 134 and the guide projections 135 is also secured. Further, the fact that the pair of guide projections 135 slidably contact with the outer side edges of the wide opposite end portions 121b of the movable member 121 formed with the cam slots 127 can effectively prevent the cam slots 127 from being damaged even when during operation, an unexpected force is applied to the cam slots 127 side.

When the lid L is to be closed, the other end portion 109b of the check lever 109 bears against the upper edge portion of the front side bracket 102A to thereby forcibly downwardly pivotally move one end portion 109a of the check lever 109 against the spring pressure of the torsion spring 112 and therefore, the movable member 121 makes its stopper projection 123 overlie said one end portion 109a and is permitted to move to the centering position, but when the movable member 121 is once moved to the left or the right by the pressing operation of the operating button 122A or 122B to thereby somewhat upwardly pivotally move the lid L and the bearing of the other end portion 109b against the upper edge portion of the front side bracket 102A is released, now the stopper projection 123 is brought into engagement with the side of one end portion 109a upwardly pivotally moved by the spring pressure of the torsion spring 112 and thus, the movable member is locked in that place.

Also, when the movable member 121 is moved to the left or the right by the pressing operation of the operating button 122A or 122B, the pair of long and short hinge pins 128 and 129 present on the pressed side are moved toward each other by the action of the regulating portions 127a of the cam slots 127 which present the shape of "∧", but it does not happen that the pair of long and short hinge pins 128 and 129 present on the opposite side are moved toward each other by the action of the non-regulating portions 127b of the opposed cam slots 127 which present a parallel state.

A supporting hole 143 for supporting the chamfered tip end portion 128b of the short hinge pin 128 present on each side is formed in each side of the front wall 104A of the base plate 104 correspondingly to the shaft hole 103 in the previously described front side bracket 102A. A supporting hole 144 for supporting the chamfered tip end portion of the long hinge pin 129 present on each side is formed in each side of the rear wall 104B of the base plate 104 correspondingly to the shaft hole 103 in the rear side bracket 102B.

Consequently, in the present embodiment, if there is obtained a state in which the followers 128a and 129a of the long and short hinge pins 128 and 129 on each side supported by the guide members 130 are engaged in the cam slots 127 formed in the opposite end portions 121b of the movable member 121, and the movable member 121 is movably mounted in the area 105 of the base plate 104 through the two decoration frames 131 while the holding block 106 is contained in the intermediate portion 121a of the movable member 121, and a suitable cover member 145 is put on the base plate 104, the lid L can be assembled very simply.

Accordingly, thereafter, if by the pressing operation or the like of the already described integral type operating buttons 122A and 122B, the chamfered tip end portions 128b and 129b of the pair of long and short hinge pins 128 and 129 present on each side are engaged in the corresponding shaft holes 103 in the front and rear brackets 102A and 102B, it will become possible to pivotally mount the lid L on the box body B side.

Figure 20:
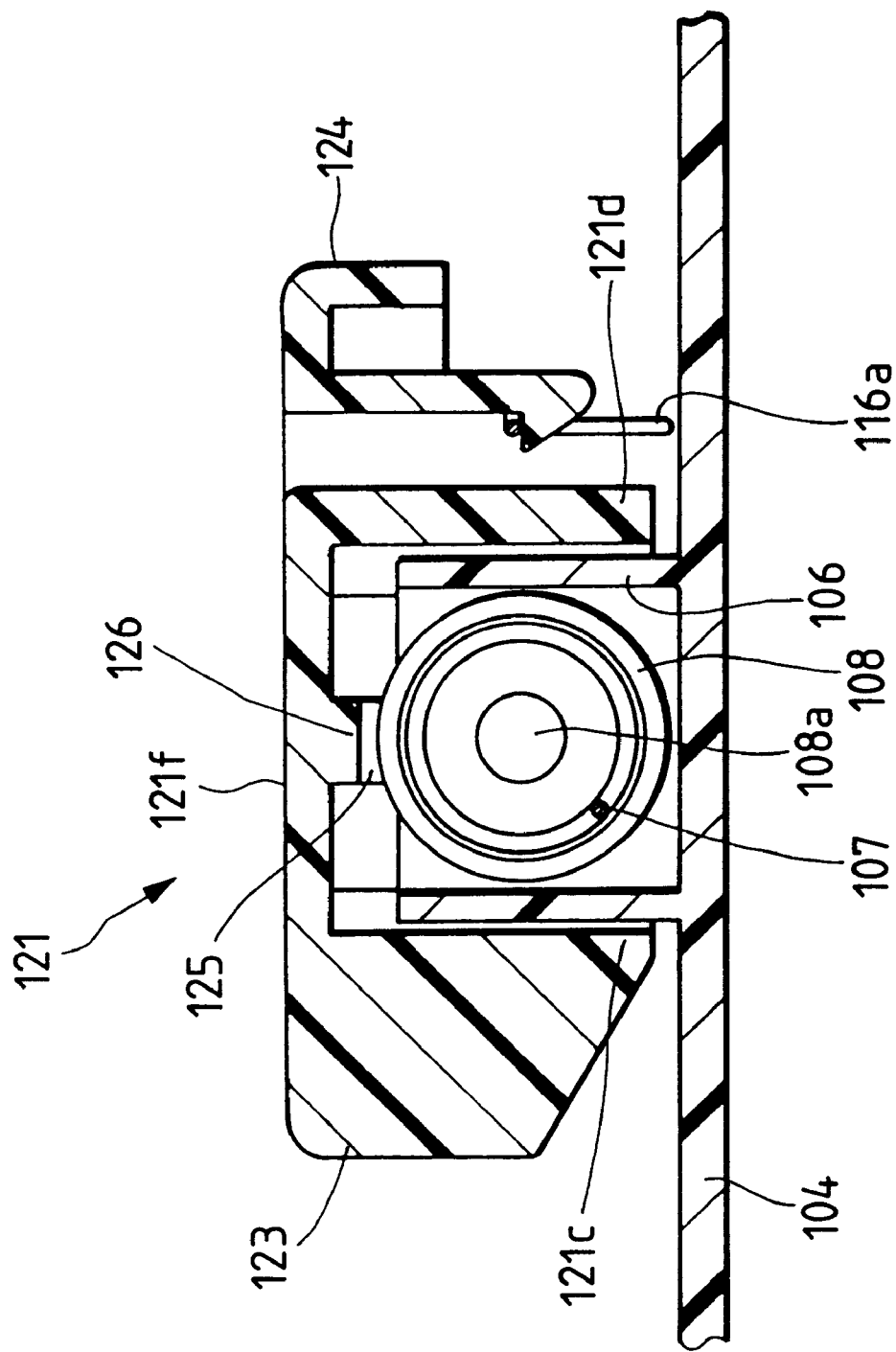
FIG. 20 is a cross-sectional view of essential portions showing the relation between the intermediate portion of the movable member and a holding block containing a compression coil spring therein.

In the state in which the movable member 121 is mounted, as shown in FIG. 20, the holding block 106 containing the compression coil spring 109 therein is substantially completely surrounded by the upper wall 121f and two side walls 121c and 121d of the movable member 121 and is located in the intermediate portion 121a of the movable member 121 and therefore, the effective utilization of the space over the area 105 becomes possible and also, the propagation of abnormal sound produced during the expansion and contraction of the compression coil spring 107 can be effectively suppressed.

Also, the fact that two side walls 121c, 121d and a pair of leg pieces 125 are present in parallelism to each other in the intermediate position 121a of the movable member 121 means that the rigidity of the movable member 121 itself can be improved and also the leg pieces 125 can interfere with the centers of the opposite end portions of the compression coil spring 107 and therefore, the stable expansion and contraction of the compression coil spring 107 can be ensured and during the expansion and contraction of the compression coil spring 107, in addition to the caps 108 attached to the opposite end portions thereof, the rib wall 126 faces the upper opening side of the holding block 106, whereby the buckling of the compression coil spring 107 can also be effectively prevented.

Figure 21:
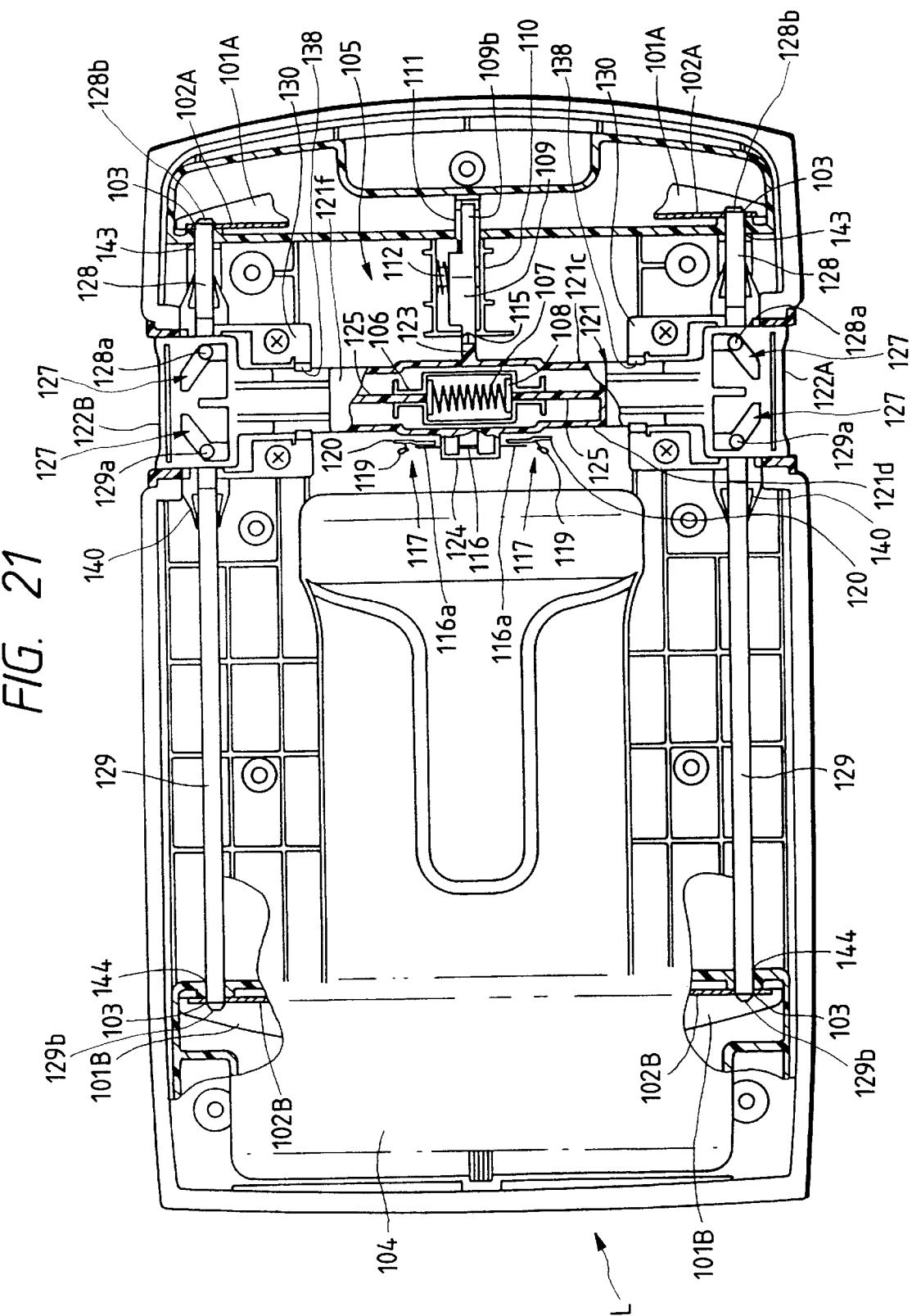
FIG. 21 is a cross-sectional view showing the closed state of the lid.

In such an opening and closing apparatus, when the lid L is in its closed state, as shown in FIG. 21, the movable member 121 integral with the operating buttons is biased to the centering position in the area 105 of the base plate 104 by the spring pressure of the compression coil spring 107 contained in the holding block 106 and therefore, the chamfered tip end portions 128b and 129b of the pair of long and short hinge pins 128 and 129 present on each side are engaged in the shaft holes 103 in the front and rear brackets 102A and 102B via the supporting holes 143 and 144, whereby a reliable closed state is ensured.

Figure 22:
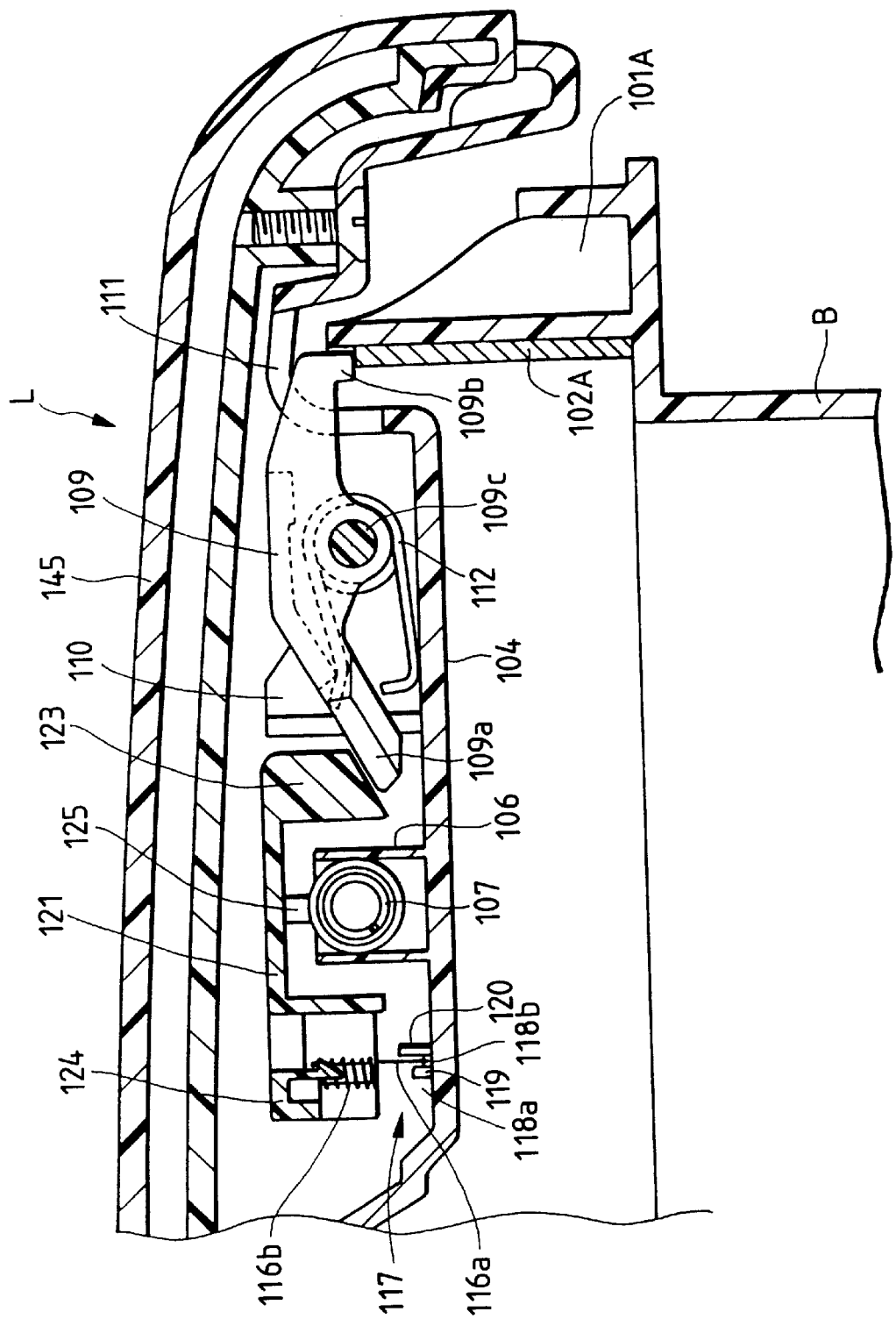
FIG. 22 is a cross-sectional view of essential portions showing the relation between the stopper projection and the check lever in the closed state of the lid.

In this closed state, the followers 128a and 129a of the pair of long and short hinge pins 128 and 129 present on each side lie in the boundary between the regulating portions 127a and non-regulating portions 127b of the opposed cam slots 127, as shown, while the other end portion 109b of the check lever 109 bears against the upper edge portion of the front side bracket 102A of the box body B to thereby downwardly press its own one end portion 109a against the spring pressure of the torsion spring 112 and therefore, the stopper projection 123 of the movable member 121 only overlies one end portion 109a of the check lever 109, as shown in FIG. 22. Also, each bent tip end portion 116a of the spring bar 116 waits at the neutral position X1 of the corresponding guide cam 117, as shown in FIG. 17B.

Figure 23:
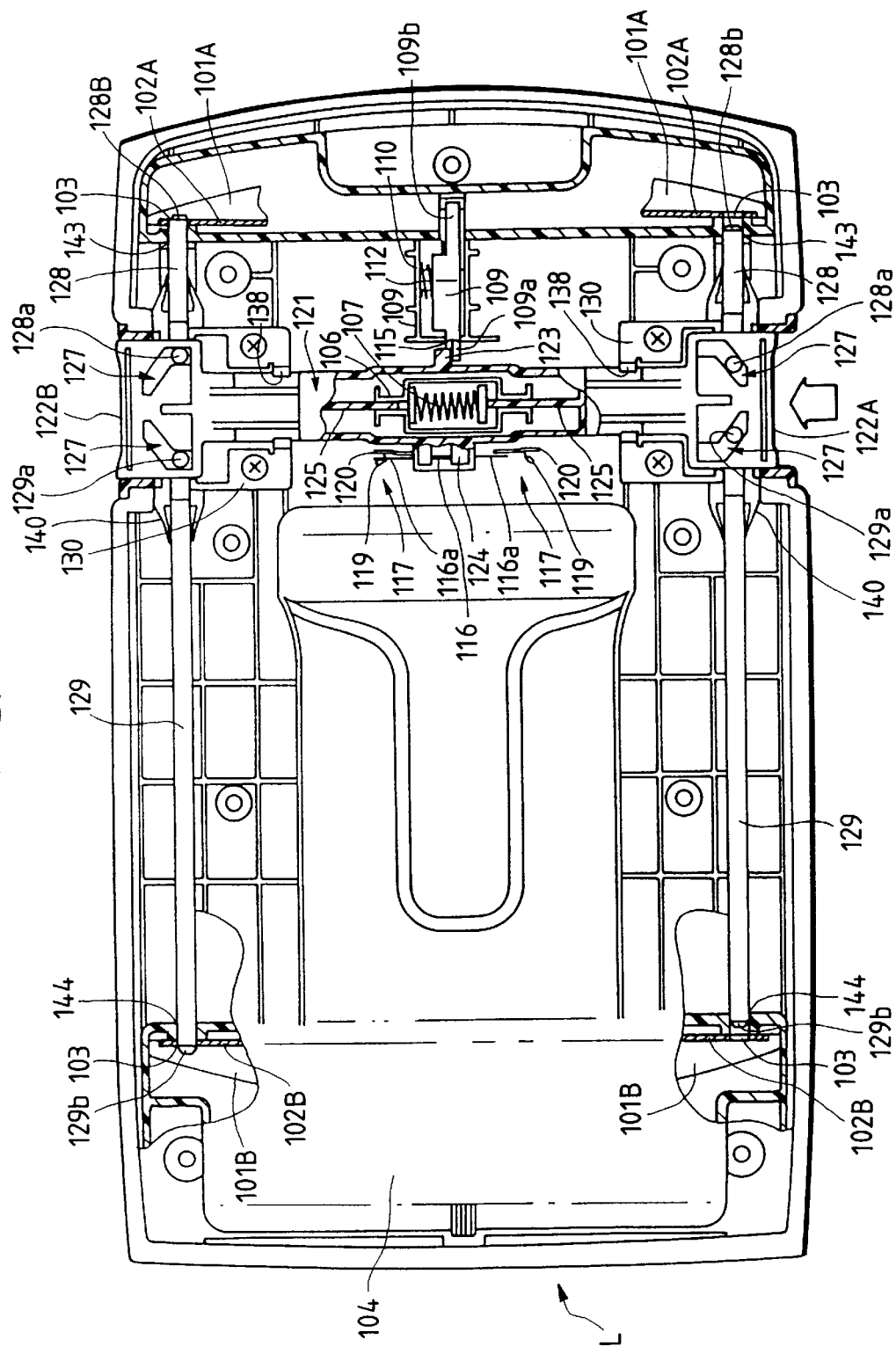
FIG. 23 is a cross-sectional view showing a state in which the right operating button has been pressed.

When in the closed state of the lid L, the lid L is to be leftwardly pivotally moved to open the opening portion of the box body B, the right operating button 122A is inwardly pressed against the spring pressure of the compression coil spring 107 contained in the holding block 106, whereupon as shown in FIG. 23, the pair of long and short hinge pins 128 and 129 present on the right side come off the shaft holes 103 in the front and rear brackets 102A and 102B by the action of the regulating portions 127a of the cam slots 127 operatively associated with the pressing movement of the operating button 122A.

Also, during the pressing of such operating button 122A, the bent tip end portion 116a of the spring bar 116 which lies on the left side is subjected to the regulation by the terminating portion of the above-described inclined portion 118c, as shown in FIG. 17B, and moves from X2 toward X4 on the outward path of the corresponding guide cam 117 while contacting with the reversing projection 119, and when this bent tip end portion 116a rides over the reversing projection 119 and moves to the entrance side of the return path 118b, it strikes against the guide wall 120 at X5 with a resilient biasing force, whereby the pressing load to the operating button 122A changes and at the same time, a pleasant sound "clang" is produced.

Accordingly, the operator manually confirms the change in the pressing load and confirms the pleasant sound by ears, and can thereby confirm on the spot that the pair of hinge pins 128 and 129 present on the opened right side have come out of the shaft holes 103 in the front and rear brackets 102A and 102B and have completely sunk into the interior of the lid L.

The bent tip end portion 116a lying on the right side of the spring bar 116 performs no function, but simply moves leftwardly from its own neutral position, and yet it stays on the corresponding guide wall 120 and therefore, there is no possibility of a wrong operation occurring during the return.

Further, at the point of time whereat the right operating button 122A has been inwardly pressed, as shown, the movable member 121 integral with this operating button 122A, of course, moves in the same direction with the left operating button 122B, but the followers 128a and 129a of the pair of long and short hinge pins 128 and 129 present on the left side are automatically directed by the non-regulating portions 127b of the opposed cam slots 127 and do not move toward each other, nor move away from each other.

Also, at this time, the movement of the movable member 121 is reliably guided by the sliding contact action of the guide projection 135 of the guide member 130 on each side provided outwardly at the longest possible distance and therefore, there is not the possibility that the movable member 121 inadvertently shakes and moves as in the prior art, and the opening operation can be performed very smoothly.

Figure 24:
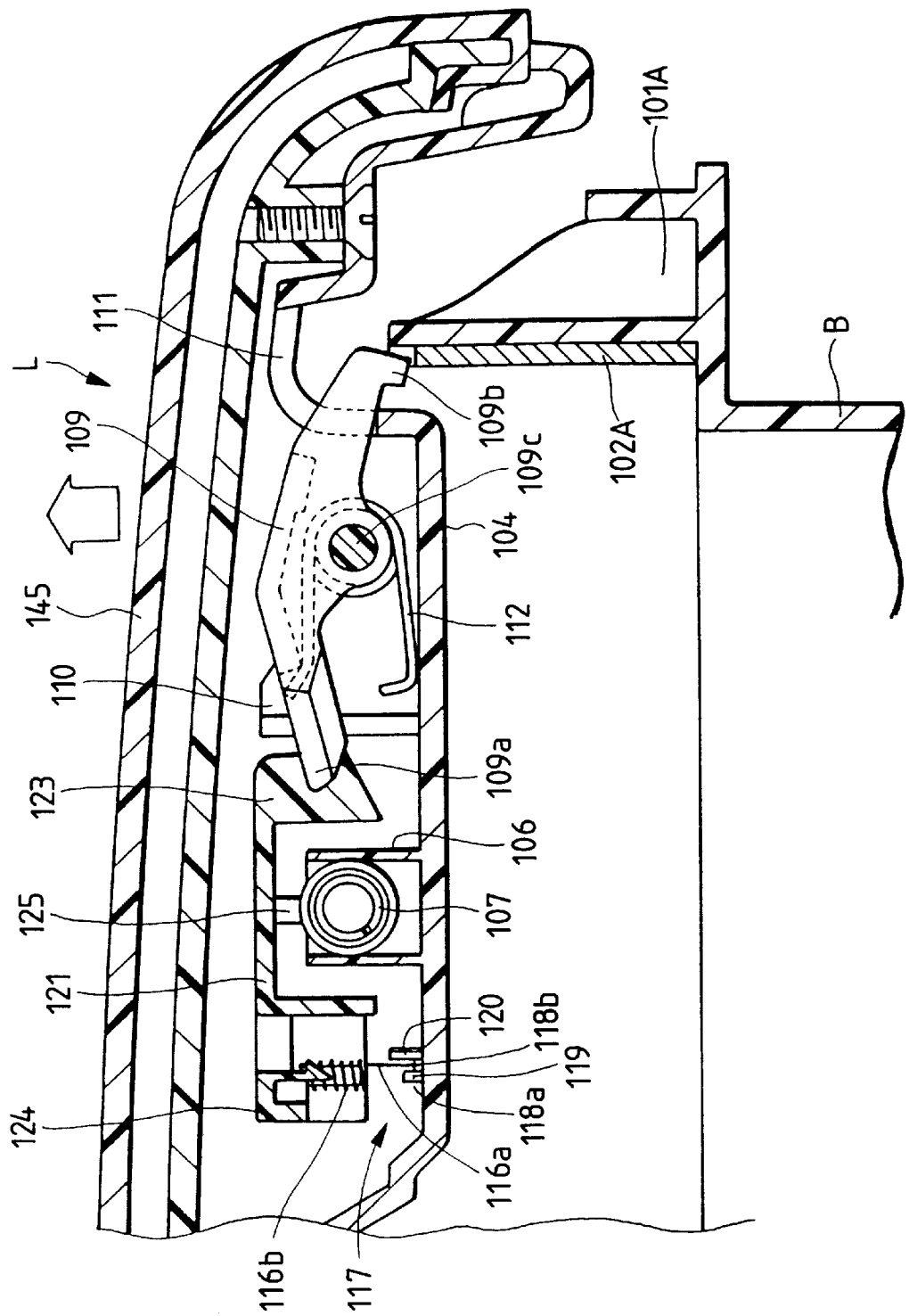
FIG. 24 is a cross-sectional view of essential portions showing the relation between the stopper projection and the check lever at a point of time whereat the lid has been opened.

So, after it has been confirmed that the pair of long and short hinge pins 128 and 129 present on the opened right side have come out of the shaft holes 103 in the front and rear brackets 102A and 102B, the lid L is somewhat upwardly pivotally moved while the operating button 122A remains pressed, whereupon as shown in FIG. 24, the state in which the other end portion 109b of the check lever 109 bears against the upper edge portion of the front side bracket 102A is released on the spot, whereby one end portion 109a of the check lever 109 is upwardly pivotally moved by the spring pressure of the torsion spring 112 to thereby cause the stopper projection 123 to automatically bear against the side of one end portion 109a.

As a result, the movable member 121 is locked in that place against the spring pressure of the compression coil spring 107 and is hampered from returning to the centering position, while the bent tip end portion 116a of the spring bar 116 located on the left side is once stopped at a position X5 whereat it has struck against the already described guide wall 120.

Figure 25:
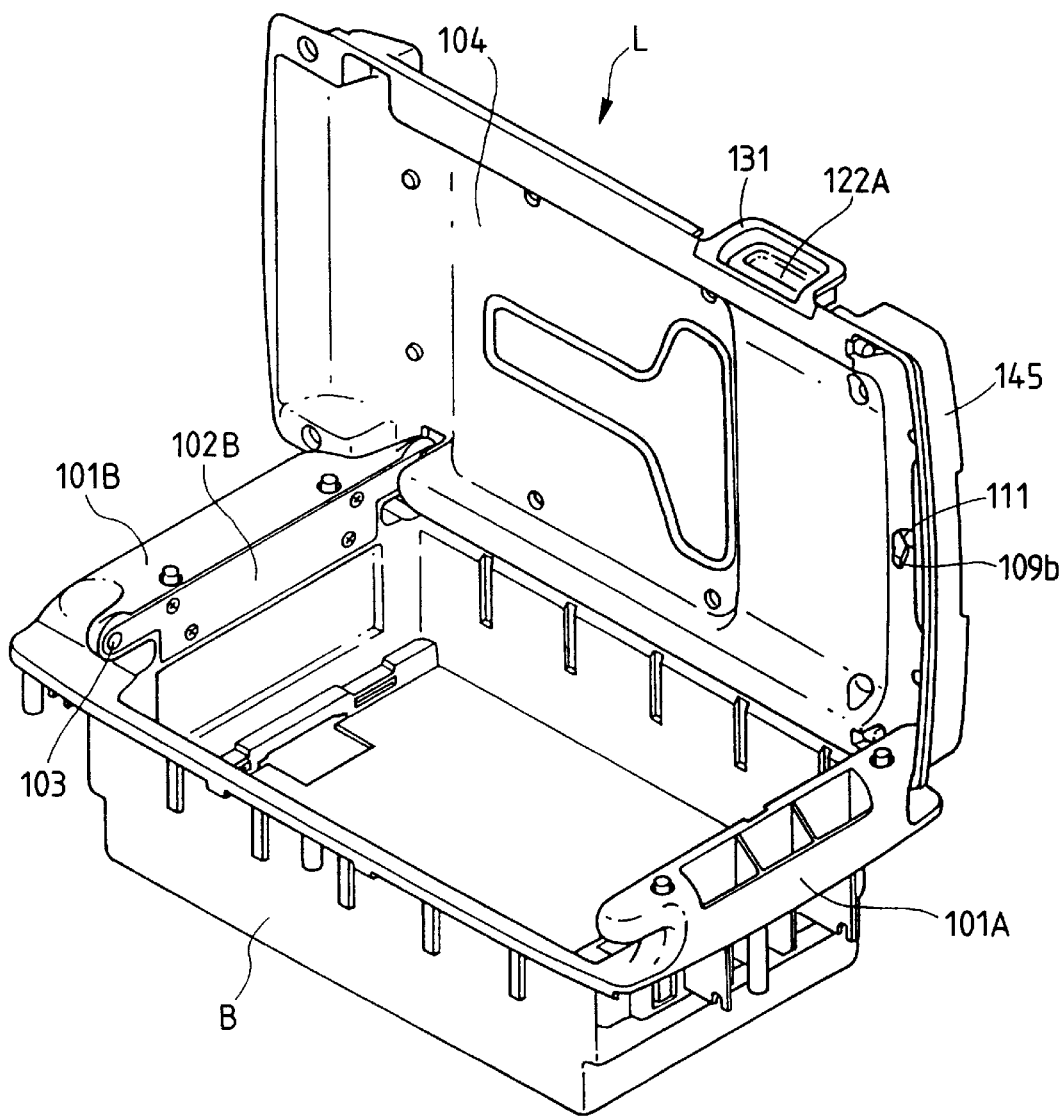
FIG. 25 is a perspective view showing a state in which the lid has been opened.

Accordingly, thereafter, if the lid L is leftwardly pivotally moved about the pair of long and short hinge pins 128 and 129 engaged in the shaft holes 103 in the front and rear brackets 102A and 102B on the left side, the opening portion of the box body B can be opened as shown in FIG. 25.

Moreover, such opening operation of the lid L is free of the fear that even if the hand is released after the lid L has been somewhat upwardly pivotally moved while the operating button 122A is pressed, the movable member 121 returns to the centering position with the operating button 122A and therefore, the pivotally moving operation of the lid L becomes highly convenient. Also, in this state, even if an attempt is made to press the left operating button 122B by mistake, such pressing operation can also be blocked by the stopper projection 123 bearing against one end portion 109a of the check lever 109.

When the lid L in its fully opened state is to be closed, the lid L is rightwardly pivotally moved about the pair of long and short hinge pins 128 and 129 engaged in the shaft holes 103 in the front and rear brackets 102A and 102B on the left side and the lid L is brought down until it bears against the edge of the opening portion of the box body B, whereupon the other end portion 109b of the check lever 109 facing outwardly from the window 111 now bears against the upper edge portion of the front bracket 102A to thereby downwardly press one end portion 109a of the check lever 109 against the spring pressure of the torsion spring 112 and release the bearing state of the stopper projection 123 against the side thereof, whereby the movable member 121 is returned to the centering position by the spring pressure of the compression coil spring 107 and at the same time, in operative association therewith, the pair of long and short hinge pins 128 and 129 present on the right side are automatically engaged from the supporting holes 143 and 144 into the corresponding shaft holes 103 in the front and rear brackets 102A and 102B by the action of the regulating portions 127a of the cam slots 127 and thus, the lid L is closed.

Also, at this time, the bent tip end portion 116a of the spring bar 116 located on the left side, in operative association with the movable member 121, moves from X6 toward X8 in the return path 118b of the corresponding guide cam 117 and returns to the neutral position X1 of that guide cam 117 and at the same time, the bent tip end portion 116a of the spring bar 116 located on the right side also returns to the neutral position along the guide wall 120 of the corresponding guide cam 117.

In the process of the bent tip end portion 116a moving in the return path 118b along the guide wall 120, the bent tip end portion 116a moves while being gradually pressed by the inclined portion 118c, and when it passes the terminating portion thereof, the pressing state against the bent tip end portion 116a is released and now the bent tip end portion 116a bears against the bottom surface of the base plate 104 with a resiliently biasing force and produces a pleasant sound "clang" and thus, now it can also be confirmed that the pair of long and short hinge pins 128 and 129 present on the right side have been engaged in the corresponding shaft holes 103.

Figure 26:
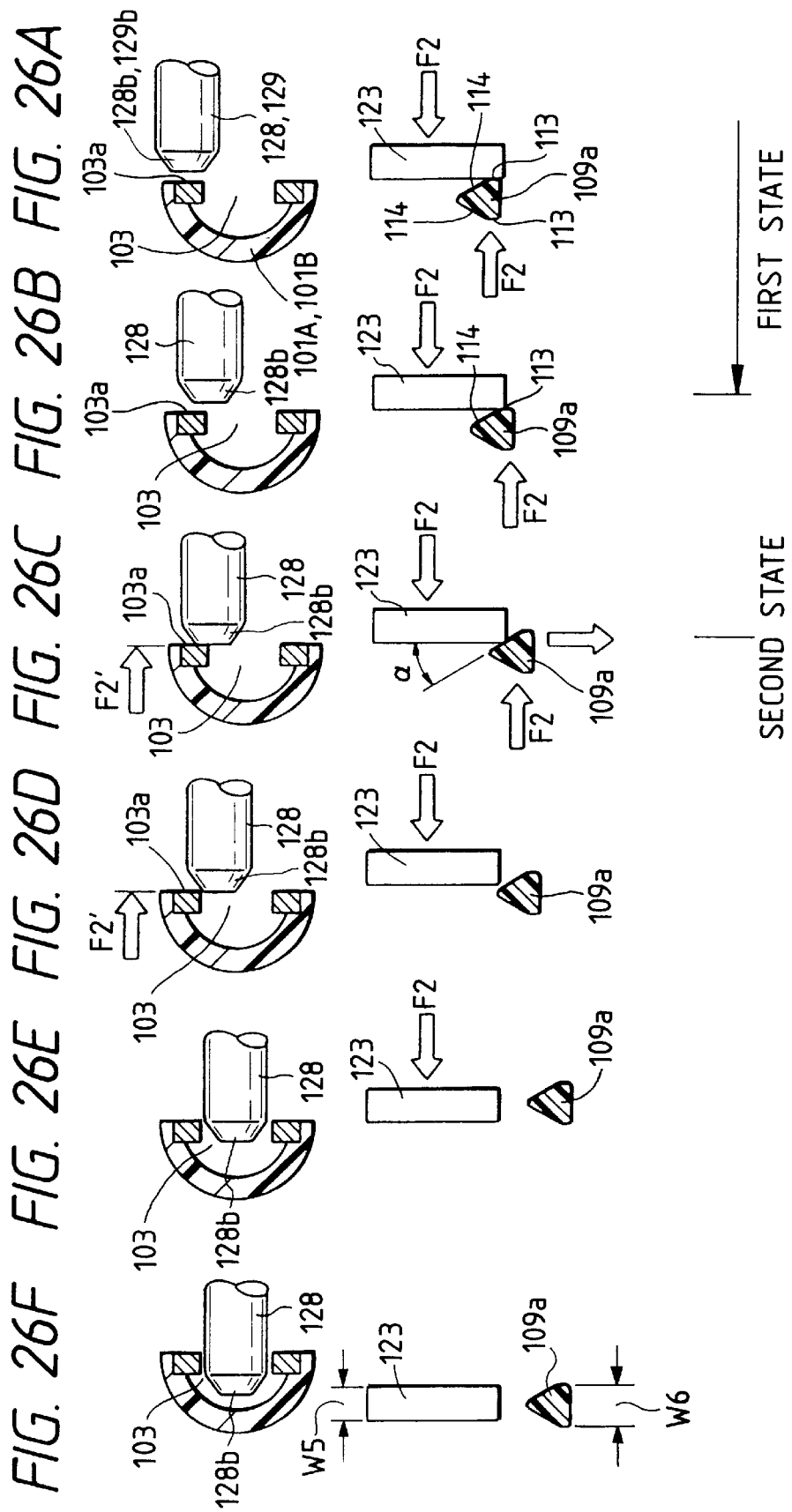
FIGS. 26A, 26B, 26C, 26D, 26E and 26F are illustrations of essential portions showing the relation between the stopper projection and one end portion of the check lever and the relation between the chamfered tip end portion of the hinge pin and a shaft hole in the closing process of the lid.
Figure 27:
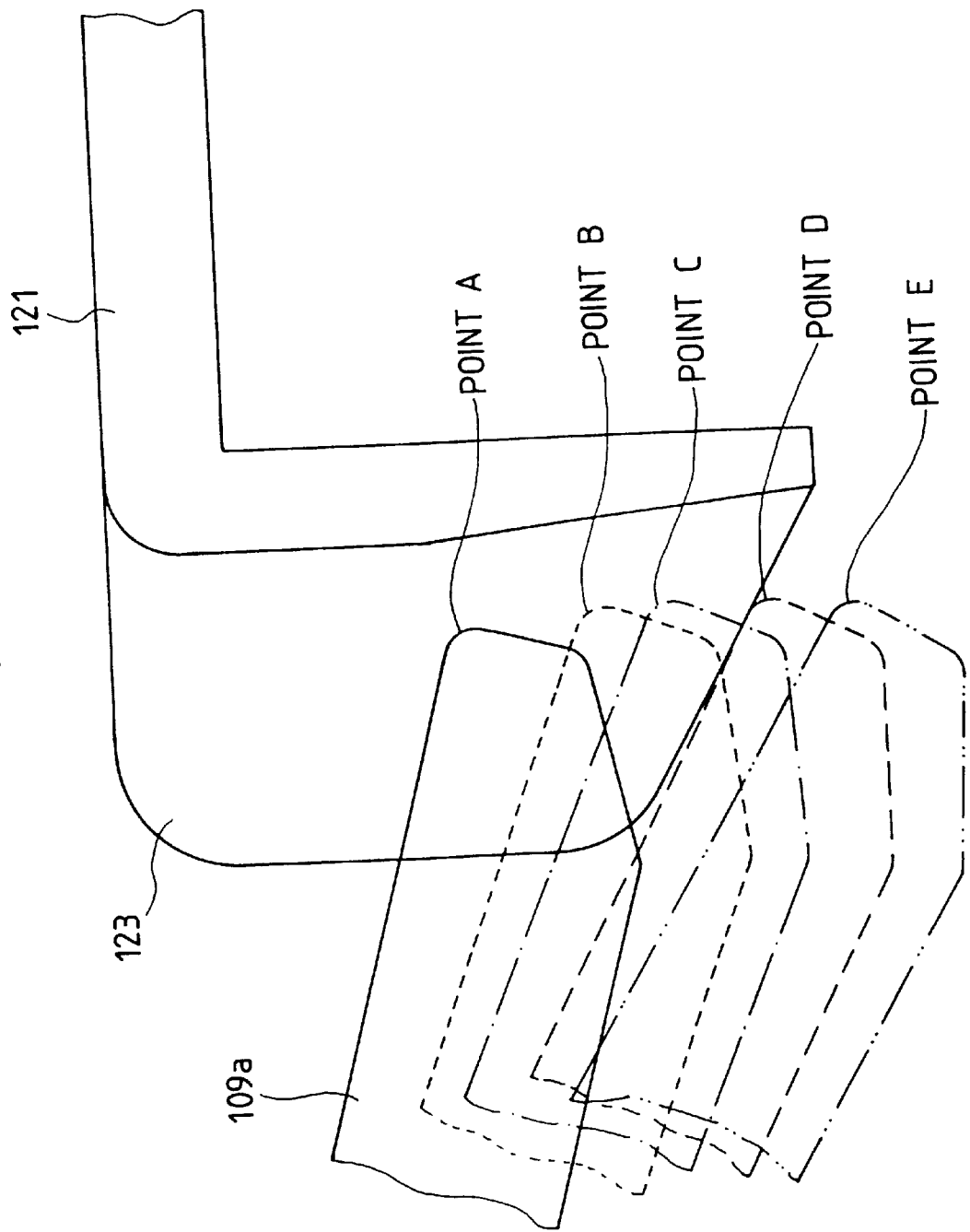
FIG. 27 is an illustration of essential portions showing the pivotally moved state of one end portion of the check lever relative to the stopper projection.

The closing process of the lid L will now be described in detail with reference to FIGS. 26A to 26F and 27. In the present embodiment, as shown in FIG. 26A, the movable member 121 is locked in that place against the spring pressure F2 of the compression coil spring 107 by the reaction force F by the engagement of the stopper projection 123 with the vertical surface 113 of one end portion 109a of the check lever 109 until the other end portion 109b of the check lever 109 bears against the upper edge portion of the front side bracket 102A, but within a range in which the other end portion 109b bears against the upper edge portion of the front side bracket 102A and one end portion 109a begins to downwardly pivot against the torsion spring 112, as shown in FIG. 26B, the stopper projection 123 only slides on the vertical surface 113 of one end portion 109a and therefore, the movable member 121 is still locked in that place by the reaction force F2 received from one end portion 109a of the check lever 109. In this case, the state of FIG. 26A corresponds to a point A in FIG. 27, and the state of FIG. 26B corresponds to a point B in FIG. 27. Also, the range of FIGS. 26A–26B corresponds to a first state in which the hinge pins 128, 129 and the outline edges 103a of the shaft holes 103 are greatly spaced apart from each other in the opening direction of the lid L.

When one end portion 109a further downwardly pivots, the stopper projection 123 shifts from the vertical surface 113 of said one end portion 109a onto the tapered surface 114 in conformity with the angle of inclination α of the vertical surface 113 and therefore, the movable member 121 gradually move toward the centering position to thereby push out the hinge pins 128, 129 on the opening side toward the shaft holes 103 by the action of the regulating portions 127a of the cam slots 127.

Figure 28:
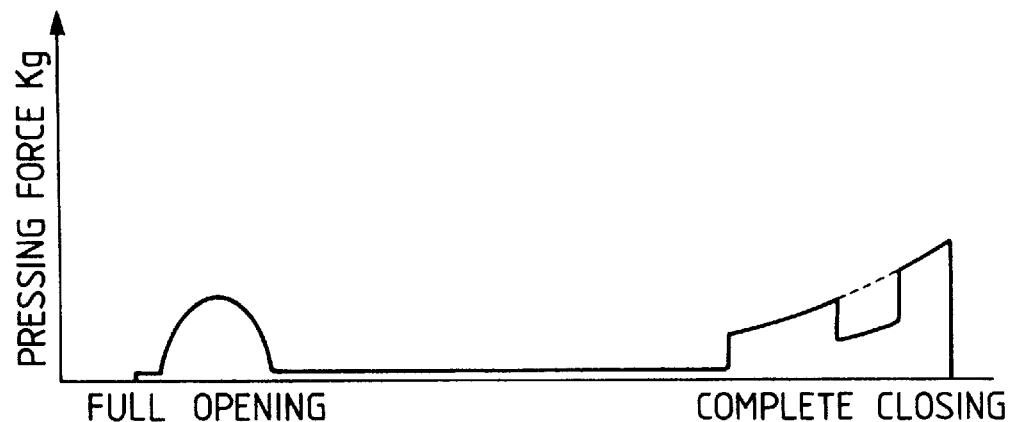
FIG. 28 is a graph illustrating a pressing force necessary to close the lid.

Again at this time, one end portion 109a of the check lever 109 receives the reaction force F2 of the compression coil spring 107, but the check lever 109 receives a downward load at F2×tanα in conformity with the angle of inclination of its own tapered surface 114 and therefore, as shown in FIG. 28, the force pressing the lid L toward the box body B side against the spring pressure of the torsion spring 112 is reduced, whereby the operator can understand by the feeling of his hand that the fully closed state of the lid L has drawn near and therefore, the operation feeling is improved.

When as shown in FIG. 26C, in operative association with the movement of the movable member 121, the chamfered tip end portions 128b and 129b of the hinge pins 128 and 129 pushed out toward the shaft holes 103 then bear against the outline edges 103a of the corresponding shaft holes 103, one end portion 109a of the check lever 109 pivots freely downwardly while separating from the stopper projection 123, as shown in FIG. 26D, but the movable member 121 is now hampered from moving to the centering position by receiving the reaction force F2' of the compression coil spring 107 from the outline edge 103a of the shaft hole 103. In the state of FIG. 26D, the underside of the stopper projection 123 lies on the terminal end of the tapered surface 114 and the chamfered edges of the tip end portions 128b and 129b of the hinge pins 128 and 129 bear against the edges of the shaft holes 103. The state of FIG. 26C corresponds to a point C in FIG. 27, and the state of FIG. 26D corresponds to a point D in FIG. 27.

Also, FIG. 26C corresponds to a second state in which the hinge pins 128, 129 and the outline edges 103a of the shaft holes 103 approach each other.

When the lid L is further urged to its fully closed position, the chamfered tip end portions 128b and 129b of the hinge pins 128 and 129 coincide with the corresponding shaft holes 103, as shown in FIG. 26E, to thereby release the movement hampering state by the reaction force F2' of the movable member 121 and therefore, the movable member 121 is permitted to be returned to the centering position by the spring pressure of the compression coil spring 107 and at the same time, the hinge pins 128 and 129 on the opening side can be completely engaged in the corresponding shaft holes 103 by the action of the regulating portions 127a of the cam slots 127, as shown in FIG. 26F, whereby the closed state of the lid L is ensured. The states of FIGS. 26E and 26F correspond to a point E in FIG. 27.

Figure 29:
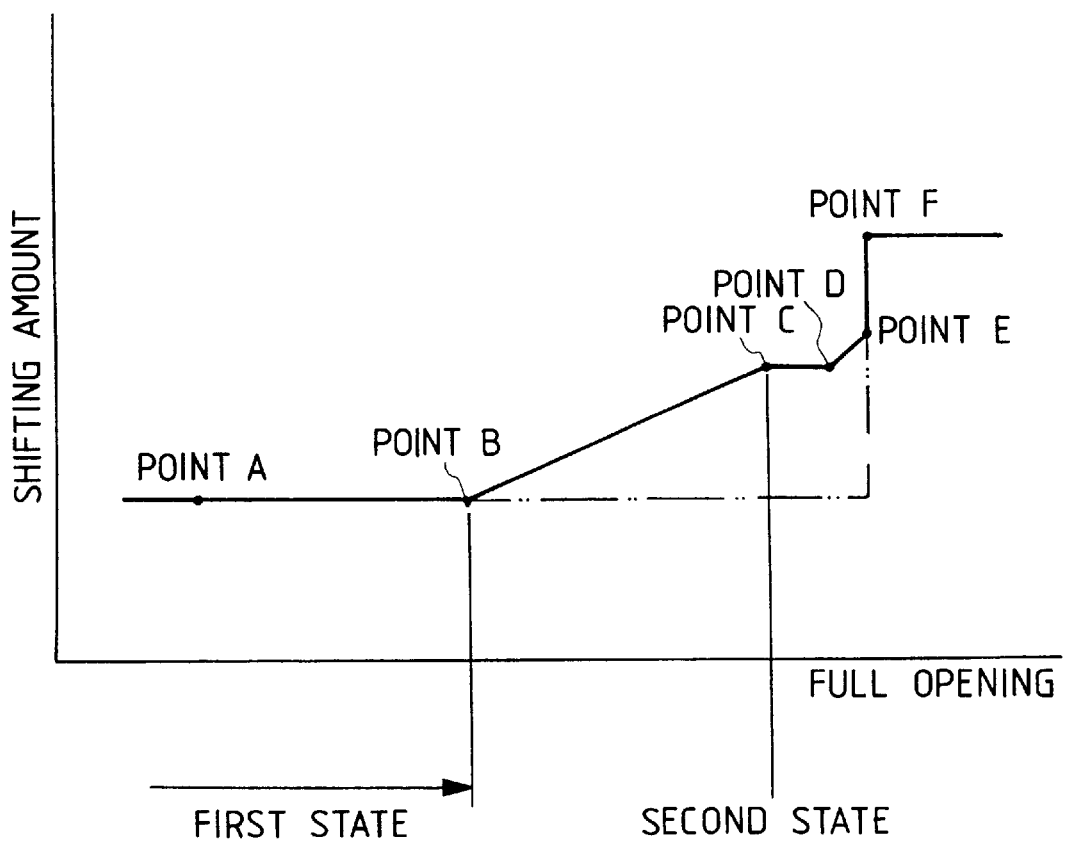
FIG. 29 is a graph illustrating changes in the amount of axial movement of the hinge pin.

Thus, the hinge pins 128 and 129 in the present embodiment, as is apparent from FIG. 29, unlike the prior-art apparatus indicated by dot-and-dash lines, have their amounts of axial movement varied as indicated by solid line.

That is, in the present embodiment, at the initial stage whereat one end portion 109a of the check lever 109 downwardly pivots against the spring pressure of the torsion spring 112, as in the prior-art apparatus, one end portion 109a of the check lever 109 and the stopper projection 123 come into engagement with each other to thereby block the movement of the movable member 121, but in the vicinity of the fully closed state of the lid L, the engagement between one end portion 109a of the check lever 109 and the stopper projection 123 is released and the hinge pins 128 and 129 bear against the outline edges 103a of the shaft holes 103 to thereby block the return of the movable member 121 to the centering position, and at a point of time whereat the chamfered tip end portions 128b and 129b of the hinge pins 128 and 129 have coincided with the shaft holes 103, the return of the movable member 121 to the centering position is permitted and thus, there is no fear that any wrong operation occurs.

One end portion 109a of the check lever 109 and the stopper projection 123 become free from halfway of the tapered surface 114 and therefore, when the force urging the lid L in its fully closing direction is weakened, there is no fear that as in the prior-art apparatus, the upper surface of one end portion 109a of the check lever 109 and the lower surface of the stopper projection 123 will be caught by each other if one end portion 109a of the check lever 109 is upwardly pivotally moved by the spring pressure of the torsion spring 112.

When the force urging the lid L in its fully closing direction is further weakened or rendered zero, the lid L only assumes a state shown in FIG. 26C if it is pushed back a little in its opening direction by the spring pressure of the torsion spring 112 biasing the check lever 109 and therefore, it never happens that the check lever is caught by the stopper projection and the movement thereof becomes impossible.

Further, even if in the state of FIG. 26C, the lid L is pivotally moved to a position in which the hinge pins 128 and 129 on the opening side separate from the corresponding shaft holes 103 and now the operating button 122B on the opening side is pressed, it never happens that as in the first embodiment, the movable member 121 is moved to the centering position to thereby disengage the hinge pins 128 and 129 on the closing side from the shaft holes 103, because the stopper projection 123 is engaged with the tapered surface 114 of one end portion 109a of the check lever 109 to thereby hamper the return of the movable member 121 to the centering position. Accordingly, there cannot arise a situation in which the lid L comes off the box body B by mistake.

Conversely, when the lid L is to be rightwardly pivotally moved to open the opening portion of the box body B, although not specifically shown, if the left operating button 122B is now pressed, the lid L can be opened by way of a process similar to that previously described, and when the lid L in its fully opened state is to be closed, if an operation similar to that previously described is performed, the lid L can be simply closed, and again at this time, under the already described principle, the lid L is of course closed relative to the box body B in a state in which there is no fear of wrong operation.

Again in this case, the movement of the movable member 121 is guided by the guide projection 135 of each guide member 130 and the long and short hinge pins 128 and 129 are guided by the guide groove portion 134 and therefore, of course, the opening operation can be performed smoothly.

Also, in the present embodiment, the movable member 121 is biased to the centering position by only a compression coil spring 107 contained in the holding block 106 and therefore, even if during the opening operation of the lid L, the operating button 122A or 122B is pressed from one of the right direction and the left direction, there is no fear that as in the prior art, the feeling of operation becomes non-uniform.

When the lid L is to be rightwardly pivotally moved to open the opening portion of the box body B, although not specifically shown, if the left operating button 122B is inwardly pressed against the spring pressure of the compression coil spring 107, the lid L is permitted to rightwardly pivot about the pair of long and short hinge pins 128 and 129 engaged in the shaft holes 103 in the front and rear brackets 102A and 102B on the right side, as previously described.

In this case, the bent tip end portion 116a positioned at the left of the spring bar 116 moves in the outward path 118a of the corresponding guide cam 117 while contacting with the reversing projection 119, in operative association with the movable member 121, and when the bent tip end portion 116a rides over the reversing projection 119 and moves toward the guide wall 120 side, the pressing load to the operating button 122B changes and at the same time, a pleasant sound "clang" is produced, whereby the operator can confirm that the pair of long and short hinge pins 128 and 129 present on the opened left side have come out of the shaft holes 103 in the front and rear brackets 102A and 102B and have sunk into the interior of the lid L.

Also, at a point of time whereat the lid L has been somewhat upwardly pivotally moved while the left operating button 122B is inwardly pressed, one end portion 109a of the check lever 109 is upwardly pivotally moved by the spring pressure of the torsion spring 112 to thereby cause the stopper projection 123 of the movable member 121 to bear against its own side and therefore, the movable member 121 is hampered from returning to the centering position by the spring pressure of the compression coil spring 107 and the bent tip end portion 116a of the spring bar 116 located on the right side stops at a position whereat it has struck against the already described guide wall 120.

When the lid L in its opened state is to be closed, if as previously described, the lid L is brought down until it bears against the edge of the opening portion of the box body B, the other end portion 109b of the check lever 109 bears against the upper edge portion of the front side bracket 102A to thereby downwardly press one end portion 109a of the check lever 109 against the spring pressure of the torsion spring 112 and release the bearing thereof against the stopper projection 123, whereby the movable member 121 is again returned to the centering position and at the same time, in operative association therewith, the pair of long and short hinge pins 128 and 129 are again engaged in the corresponding shaft holes 103 in the front and rear brackets 102A and 102B.

Also at this time, likewise, the bent tip end portion 116a of the spring bar 116 positioned on the right side moves in the return path 118b of the corresponding guide cam 117 and again returns to its neutral position and at the same time, the bent tip end portion 116a of the spring bar 116 positioned on the left side of course returns from X9 to the neutral position X1 of the guide cam 117.

The above-described embodiment is designed such that in an attempt to simplify the structure, it can be confirmed by the utilization of a spring bar 116 having a pair of bent tip end portions 116a and bisymmetrically disposed two guide cams 117 that the long and short hinge pins 128 and 129 present on each side have come off the corresponding shaft holes 103, whereas the present invention is not restricted thereto, but design may be arbitrarily made such that a similar confirming operation can be obtained with the spring bar 116 and guide cams 117 individually disposed for each pressing direction of the operating buttons 122A and 122B.

This confirming means utilizing the spring bar 116 and guide cams 117 is not restricted to the apparatus for opening and closing the lid L from two directions, but can also be applied to an apparatus which can open and close the lid L from only one direction. In this latter case, the spring bar 116 is fixed to an operating button pressably disposed on the lid L side or to a region connected to said operating button, through the holder wall 124, and a guide cam 117 is provided at a location opposed to the spring bar 116.

Though the spring bar 116 is provided on the movable member 121 and the guide cam 117 is provided on the base plate 104 of the lid L in the above-described embodiment, contrarily, as shown in FIG. 30, the spring bar 216 may be provided on the base plate 104 of the lid L and the guide cam 217 may be provided on the movable member 121 to obtain the same function and effect as those of the above-described embodiment.

Though the tapered surfaces 114 are provided on the one end portion 109a of the check lever 109 in the above-described embodiment, tapered surfaces may be provided on a stopper projection of a movable member as shown in FIG. 31A. A lower portion 223a of a stopper projection 223 of a movable member 221 is engageable with a check lever 209. The width W1 is larger than the width of an upper portion 223b. The lower portion 223a has a pair of tapered surfaces 223t opposite with each other. The tapered surface 223t requires to have a predetermined width W2, W3 in the direction of the movement of the movable member 221 to obtain the desired effect. The check lever 209 may have an end portion 209a which has a reduced width W4 and which is engageable with the stopper projection 223. Given that the width of the stopper projection 123 is W5 and the width of the end portion 109a of the check lever 109 is W6, a sum of the width W1 of the stopper projection 223 and the width W4 of the end portion 209a of the check lever 209 is equal to a sum of the width W5 and the width W6. The remaining constructions are the same as those of the above-described embodiment.

Figure 31B:
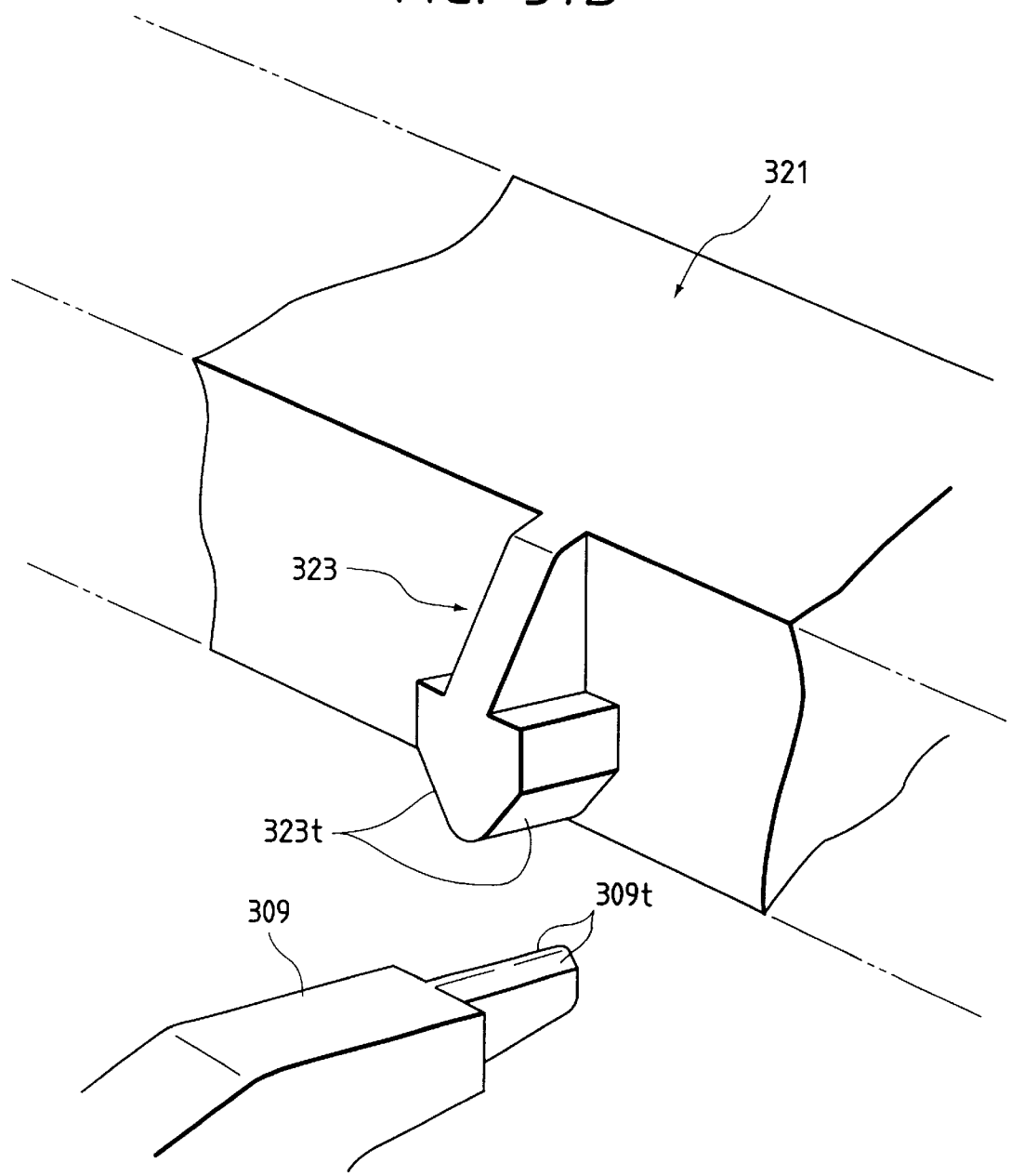

Also, as shown in FIG. 31B, tapered surfaces 323t and 309t may be provided on both of a stopper projection 323 of a movable member 321 and a check lever 309. The remaining constructions are the same as those of the above-described embodiment.

As described above, the present invention is characterized in that there is obtained the action of control means for detecting the angle of opening of the lid and controlling the hinge pins and in the vicinity of the fully closed position of the lid, the hinge pins are once caused to bear against the outline edges of the corresponding concave hole portions, and then, at a point of time whereat the hinge pins have coincided with the concave hole portions, the hinge pins are engaged in the concave hole portions by the biasing means therefor and thus, there is no fear that any wrong operation occurs, and it has been made impossible for the lid to come off the box body by mistake.

Particularly, in addition to the above-noted advantage, the operation feeling is improved and the resilient deformation of the check lever is decreased and the positional accuracy of the tapered surface in the left to right direction is improved, and this leads to the advantage that the movement of the hinge pins is maintained highly accurate and the prevention of the occurrence of the wrong operation becomes more reliable.

Also, in the present invention, by the adoption of the above-described construction, the movable member to which the operating buttons are connected is biased to the centering position by a spring contained in the holding block and therefore, there is no fear that from whatever direction the operating button is pressed during the opening operation, the operation feeling becomes non-uniform as in the prior art.

Also, the holding block is surrounded by the upper wall and two side walls of the movable member and therefore, the effective utilization of the space becomes possible and the propagation of abnormal sound produced during the expansion and contraction of the compression coil spring can be suppressed. Also, the opposite side walls and leg pieces are present on the intermediate portion of the movable member and therefore, the rigidity of the movable member itself can be improved and the leg pieces can interfere with the centers of the opposite end portions of the compression coil spring and thus, the stable expansion and contraction of the compression coil spring can be ensured. Also, there is the advantage that the buckling of the compression coil spring can be effectively prevented.

As described above, in the present invention, by the adoption of the above-described construction, after the hinge pins have come off the shaft holes in the box body due to the operation of the operating button, the tip end portion of the spring bar moves from the reversing projection to the guide wall by the resilient biasing force, whereby the operating load to the operating button changes and at the same time, there is produced a pleasant sound "clang".

Accordingly, the operator confirms the change in the operating load by his hand and confirms the pleasant sound by his ears, and can thereby confirm on the spot that the hinge pins on the opening side have come off the corresponding shaft holes in the box body.

Also, the wrong operation of the spring bar and guide cams becomes null and it can be conformed by a pleasant sound that the hinge pins have returned to their neutral position, and well-balanced smooth opening and closing operations and space saving resulting from separation can be expected.

As described above, in the present invention, by the adoption of the above-described construction, the guide portion for guiding the movement of the long movable member is provided outwardly at a longest possible distance and therefore, it becomes possible to smoothly guide the movement of the movable member resulting from the pressing of the operating button, without shaking, and thus, a smooth opening operation including the coming into and out of the hinge pins can be ensured.

Also, the guide portion for the movable member and the guide portion for the hinge pins provided integrally with each other and therefore, the guide of the relative movement of the movable member and the hinge pins becomes reliable. Also, in addition to these operational effects, the posture holding pieces are provided on the guide member and therefore, the supporting rigidity of the guide portions for the movable member and the hinge pins is improved. Also, the movable member and the guide member can be tentatively assembled together by the tentatively assembling resilient piece and therefore, the assembling work becomes easy. Further, the guide portion slidably contacts with the outer edge defining the cam slots and therefore, even when an unexpected extraneous force is applied to the cam slot side, the cam slots themselves can be effectively prevented from being damaged.

What is claimed is:

1. A container combination including:

a box body;

a lid selectable between a state in which said lid has a rotation axis in a first side to be openable and closable in a first direction relative to said box body and a state in which said lid has a rotation axis in a second side to be openable and closable in a second direction relative to said box body;

a movable member movable to a first position when said lid is opened in said first direction, a second position when said lid is opened in said second direction, and a closing position when said lid is closed, said closing position residing between said first position and said second position, said movable member extending parallel with a direction between said first side and said second side, said movable member having opposite end portions and an intermediate portion connecting the opposite end portions;

first and second operating buttons coupled to the opposite end portions of said movable member respectively, said first and second operating buttons being selectively operable;

a first biasing member for normally biasing said movable member to said closing position; said first biasing member exerting a biasing force a holding member for holding said movable member in said first position when said first operating button is pressed and said movable member is moved to said first position against the biasing force of said first biasing member, and holding said movable member in said second position when said second operating button is pressed and said movable member is moved to said second position against the biasing force of said first biasing member, and releasing said movable member from either of said first or second positions in response to the lid being placed in the closed state; said holding member being disposed near an edge of said lid of a lateral side connecting said first side, said second side and an end, said holding member being positioned so as to be engagable with said movable member between said first operating button and said second operating button;

said movable member being disposed near said holding member;

a first hinge member for making an engaging state of said lid and said box body in said second position and in said closing position of said movable member, while releasing said engaging state in association with a movement of said movable member to said first position to open and close said lid in said first direction; and a second hinge member for making an engaging state of said lid and said box body in said first position and in said closing position of said movable member, while releasing said engaging state in association with a movement of said movable member to said second position to open and close said lid in said second direction.

2. An apparatus according to claim 1, wherein said movable member has a stopper projection, said holding member is movable between an engagement position in which it is engagable with said stopper projection and a disengagement position in which it is disengaged from said stopper projection, and said apparatus further includes a second biasing member for normally biasing said holding member to said engagement position, said second biasing member exerting a biasing force, whereby when said lid is closed, said holding member interferes with said box body, whereby said holding member is held in said disengagement position against the biasing force of said second biasing member, and when said lid is opened in said first or second direction, said holding member is held in said engagement position by the biasing force of said second biasing member.

3. An apparatus according to claim 1, further including:

a pair of first hinge pins inserted in a pair of first holes formed in said box body, and retractable from said pair of first holes in operative association with the movement of said movable member to said first position;

a pair of second hinge pins inserted in a pair of second holes formed in said box body, and retractable from said pair of second holes in operative association with the movement of said movable member to said second position;

a first cam slot formed in that end portion of said movable member which is adjacent to said first operating button, and comprising a regulating portion and a non-regulating portion;

a second cam slot formed in that end portion of said movable member which is adjacent to said second operating button, and comprising a regulating portion and a non-regulating portion;

a first follower provided on each of said pair of first hinge pins and engaged with said first cam slot; and a second follower provided on each of said pair of second hinge pins and engaged with said second cam slot.

4. An apparatus according to claim 3, further including:

a rib adapted to contact at least one of said pair of first hinge pins and at least one of said pair of second hinge pins and provide flexure to said at least one of said pair of first and second hinge pins.

5. An apparatus according to claim 1, further including:

a bead provided on said box body; and a third biasing member engagable with said bead in the fully opened state of said lid to thereby hold said lid in a fully opened state.

6. An apparatus according to claim 1, further including:

a pair of first hinge pins inserted in a pair of first holes formed in said box body, and retractable from said pair of first holes in operative association with the movement of said movable member to said first position, each of said pair of first holes having an outline edge;

a pair of second hinge pins inserted in a pair of second holes formed in said box body, and retractable from said pair of second holes in operative association with the movement of said movable member to said second position, each of said pair of second holes having an outline edge;

wherein said holding member comes into engagement with said movable member in a first state in which said first or second hinge pins and said outline edges of said first or second holes are greatly spaced apart from each other in the opening direction of said lid, to thereby prohibit said first or second hinge pins from moving toward said first or second holes, and said holding member comes out of engagement with said movable member in a second state in which said first or second hinge pins and said outline edges of said first or second holes are proximate to each other in the opening direction of said lid, to thereby permit said first or second hinge pins to resiliently contact with said outline edges of said first or second holes by the biasing force of said first biasing member, and said holding member is gradually moved until said first or second hinge pins contact with said outline edges of said first or second holes in a process wherein said lid pivotably moves from said first state to said second state.

7. An apparatus according to claim 6, wherein said movable member has a stopper projection, said holding member is movable between an engagement position in which it is engageable with said stopper projection and a disengagement position in which it is disengaged from said stopper projection, and said apparatus further includes:

a second biasing member for normally biasing said holding member to said engagement position; and a side supporting member for guiding that portion of said holding member which is engageable with said stopper projection.

8. An apparatus according to claim 7, wherein said holding member has a vertical surface in that portion thereof which is engageable with said stopper projection, and a tapered surface continuous from said vertical surface.

9. An apparatus according to claim 8, wherein said holding member has a lower portion and an upper portion, said lower portion having two sides and said upper portion having two sides, said holding member is such that said vertical surface is formed on both sides of the lower portion thereof and a tapered surface continuous from said vertical surface is formed on both sides of the upper portion thereof, and said first and second hinge pins each have a chamfered tip end portion.

10. An apparatus according to claim 7, wherein said stopper projection has a vertical surface in that portion thereof engaged by said holding member, and a tapered surface continuous from said vertical surface.

11. An apparatus according to claim 1 wherein said first biasing member has two opposite end portions, and said apparatus further includes a holding block containing said first biasing member therein and having two guide ports opposed to each other in the direction of movement of said movable member; and a pair of legs provided an said movable member and engagable with the opposite end portions of said biasing member.

12. An apparatus according to claim 11, wherein the intermediate portion of said movable member is defined by an upper wall and two side walls, and said holding block is surrounded by said upper wall and said two side walls.

13. An apparatus according to claim 12, wherein said upper wall has an underside, said upper wall underside has a central portion, and said pair of legs are provided perpendicularly to said upper wall of said movable member between the central portion of the underside of said upper wall and said two side walls.

14. An apparatus according to claim 11, wherein said holding block has an upper portion, said upper portion has an opening, and said movable member has a rib wall facing the opening formed in the upper portion of said holding block.

15. An apparatus according to claim 11, wherein said first biasing member is a compression coil spring, said compression coil spring has opposite end portions, and said apparatus further includes caps disposed on the opposite end portions of said compression coil spring.

16. An apparatus according to claim 1, including:

a pair of first hinge pins inserted in a pair of first holes formed in said box body, and retractable from said pair of first holes in operative association with the movement of said movable member to said first position;

a pair of second hinge pins inserted in a pair of second holes formed in said box body, and retractable from said pair of second holes in operative association with the movement of said movable member to said second position;

two guide cams each having a guide wall and a reversing projection disposed at a predetermined distance from said guide wall, and provided symmetrically along the direction of movement of said movable member; and a spring bar having two tip end portions engageable with said guide cams;

wherein one of said tip end portions of said spring bar is guided by said reversing projection of one of said guide cams and is biased away from said guide wall while in operative association with the operation of said first operating button, said pair of first hinge pins move in a direction to retract from said pair of first holes, and after said pair of first hinge pins have retracted from said pair of first holes, one of said tip end portions of said spring bar is moved toward said guide wall by the spring force of said spring bar, and on the other hand, the other of said tip end portions of said spring bar is guided by said reversing projection of the other of said guide cams and is biased away from said guide wall while in operative association with the operation of said second operating button, said pair of second hinge pins move in a direction to retract from said pair of second holes, and after said pair of second hinge pins have retracted from said pair of second holes, the other of said tip end portions of said spring bar is moved toward said guide wall by the spring force of said spring bar.

17. An apparatus according to claim 16, wherein when one of said tip end portions of said spring bar is guided and moved by said reversing projection of corresponding one of said guide cams, the other of said tip end portions of said spring bar stays on said guide wall of the corresponding other of said guide cams.

18. An apparatus according to claim 16, wherein said guide cams each include a return path having an inclined portion for gradually pressing the tip end portion of said spring bar between said guide wall and said reversing projection, and a stepped portion for liberating said pressing in the end portion of said inclined portion, said stepped portion having a bottom, and the tip end portion of said spring bar moves on said return path while said lid changes from an opened state to a closed state and said hinge pins move in a direction to be inserted into said holes, and after said hinge pins have been inserted into said holes, said tip end portion of said spring bar strikes against the bottom of said stepped portion by the spring force of said spring bar.

19. An apparatus according to claim 16, wherein said spring bar and said guide cams are disposed on a side opposite to said holding member with respect to said movable member.

20. An apparatus according to claim 16, wherein said guide cams are provided on said lid, and said spring bar is provided on said movable member.

21. An apparatus according to claim 16, wherein said guide cams are provided on said movable member, and said spring bar is provided on said lid.

22. An apparatus according to claim 1, further including:

a pair of first hinge pins inserted in a pair of first holes formed in said box body, and retractable from said pair of first holes in operative association with the movement of said movable member to said first position;

a pair of second hinge pins inserted in a pair of second holes formed in said box body, and retractable from said pair of second holes in operative association with the movement of said movable member to said second position;

a first hinge pin guide portion for guiding said pair of first hinge pins;

a second hinge pin guide portion for guiding said pair of second hinge pins; and first and second movable member guide portions slidably contacting with said movable member to guide the movement of said movable member resulting from the pressing of said first or second operating button;

said first movable member guide portion being disposed adjacent to said first hinge pin guide portion, said second movable member guide portion being disposed adjacent to said second hinge pin guide portion.

23. An apparatus according to claim 22, wherein said first hinge pin guide portion and said first movable member guide portion are provided integrally with a first guide member fixed adjacent to a first edge of said lid which is opened in said first direction, and said second hinge pin guide portion and said second movable member guide portion are provided integrally with a second guide member fixed adjacent to a second edge of said lid which is opened in said second direction.

24. An apparatus according to claim 23, wherein said first guide member is such that said first movable member guide portion and said first hinge pin guide portion are provided in succession from the fixed portion fixed to said lid toward said first edge, said first hinge pin guide portion has a posture holding member bearing against an inner surface of said lid, said second guide member is such that said second movable member guide portion and said second hinge pin guide portion are provided in succession from the fixed portion fixed to said lid toward said second edge, and said second hinge pin guide portion has a posture holding member bearing against an inner surface of said lid.

25. An apparatus according to claim 23, wherein each of said first and second guide members has a resilient pawl portion to be tentatively attached to said movable member.

26. An apparatus according to claim 22, further including:

a first cam slat formed in that end portion of said movable member which is adjacent to said first operating button;

a second cam slot formed in that end portion of said movable member which is adjacent to said second operating button;

a first follower provided on each of said pair of first hinge pins and engaged with said first cam slot; and a second follower provided on each of said pair of second hinge pins and engaged with said second cam slot;

said first hinge pin guide portion slidably contacting with the end portion of said movable member in which said first cam slot is formed;

said second hinge pin guide portion slidably contacting with the end portion of said movable member in which said second cam slot is formed.

27. A container combination including:

a box body;

a lid selectable between a state in which said lid has a rotation axis in a first side to be openable and closable in a first direction relative to said box body and a state in which said lid has a rotation axis in a second side to be openable and closable in a second direction relative to said box body;

a movable member movable to a first position when said lid is opened in said first direction, a second position when said lid is opened in said second direction, and a closing position when said lid is closed, said closing position residing between said first position and said second position, said movable member having opposite end portions, said movable member extending parallel with a direction between said first side and said second side, said movable member having opposite end portions and an intermediate portion connecting the opposite end portions;

first and second operating buttons coupled to the opposite end portions of said movable member respectively, said first and second operating buttons being selectively operable;

a first biasing member for normally biasing said movable member to said closing position;

a holding member for holding said movable member in said first position when said first operating button is pressed and said movable member is moved to said first position against the biasing force of said first biasing member, and for holding said movable member in said second position when said second operating button is pressed and said movable member is moved to said second position against the biasing force of said first biasing member, and releasing the holding state in response to the closed state of said lid.

28. An opening and closing apparatus for a lid including:

a box body;

a lid openable and closable in two directions relative to said box body;

an operating button for opening and closing said lid;

a pair of hinge pins inserted in a pair of holes formed in said box body, and retractable from said pair of holes in operative association with said operating button, each of said pair of holes having an outline edge;

a biasing member;

a link for inserting said pair of hinge pins into said pair of holes by the biasing force of said biasing member; and a holding member for holding said link to cause said pair of hinge pins to be retracted from said pair of holes against the biasing force of said biasing member when said operating button is pressed;

said holding member being adapted to come into engagement with said link to thereby prohibit said hinge pins from moving toward said holes in a first state in which said hinge pins and said outline edges are greatly spaced apart from each other in the opening direction of said lid, and to be disengaged from said link to thereby permit said hinge pins to resiliently contact with said outline edges of said holes by the biasing force of said biasing member in a second state in which said hinge pins and said outline edges are proximate to each other in the opening direction of said lid, and to move said hinge pins gradually until they contact with said outline edges in the process of said lid being pivotally moved from said first state to said second state.

29. A container combination including:

a box body;

a lid selectable between a state in which said lid has a rotation axis in a first side to be openable and closable in a first direction relative to said box body and a state in which said lid has a rotation axis in a second side to be openable and closable in a second direction relative to said box body;

a movable member movable to a first position when said lid is opened in said first direction, a second position when said lid is opened in said second direction, and a closing position when said lid is closed, said closing position residing between said first position and said second position, said movable member extending parallel with a direction between said first side and said second side, said movable member having opposite end portions and an intermediate portion connecting the opposite end portions;

first and second operating buttons coupled to the opposite end portions of said movable member respectively, said first and second operating buttons being selectively operable;

a biasing member for normally biasing said movable member to said closing position, said biasing member having opposite end portions;

a holding block containing said biasing member therein and having two opposed guide ports in a direction of movement of said movable member; and a pair of legs provided on said movable member and engagable with the opposite end portions of said biasing member.

30. An opening and closing apparatus for a lid including:

a box body;

a lid openable and closable in two directions relative to said box body;

an operating button for opening and closing said lid;

a hinge pin inserted in a hole formed in said box body, and retractable from said hole in operative association with the operation of said operating button;

a guide cam having a guide wall and a reversing projection disposed at a predetermined distance from said guide wall; and a spring bar having a tip end portion engageable with said guide cam;

wherein said tip end portion of said spring bar is guided and biased away from said guide wall by said reversing projection while said hinge pin is moved in a direction to be retracted from said hole in operative association with the operation of said operating button, and after said hinge pin has been retracted from said hole, said tip end portion of said spring bar is moved toward said guide wall by the spring force of said spring bar.

31. A container combination including:

a box body;

a lid selectable between a state in which said lid has a rotation axis in a first side to be openable and closable in a first direction relative to said box body and a state in which said lid has a rotation axis in a second side to be openable and closable in a second direction relative to said box body;

a movable member movable to a first position when said lid is opened in said first direction, a second position when said lid is opened in said second direction, and a closing position, said closing position residing between said first position and said second position, said movable member extending parallel with a direction between said first side and said second side, said movable member having opposite end portions and an intermediate portion connecting the opposite end portions;

first and second operating buttons coupled to the opposite end portions of said movable member respectively, said first and second operating buttons being selectively operable;

a first biasing member for normally biasing said movable member to said closing position;

a pair of first hinge pins inserted in a pair of first holes formed in said box body, and retractable from said pair of first holes in operative association with the movement of said movable member to said first position;

a pair of second hinge pins inserted in a pair of second holes formed in said box body, and retractable from said pair of second holes in operative association with the movement of said movable member to said second position;

a first hinge pin guide portion for guiding said pair of first hinge pins;

a second hinge pin guide portion for guiding said pair of second hinge pins; and first and second movable member guide portions slidably contacting with said movable member to guide the movement of said movable member resulting from the pressing of said first or second operating button; said first movable member guide portion being disposed adjacent to said first hinge pin guide portion, said second movable member guide portion being disposed adjacent to said second hinge pin guide portion.

* * * * *